US012603196B2

(12) United States Patent
Knierim

(10) Patent No.: US 12,603,196 B2
(45) Date of Patent: Apr. 14, 2026

(54) HYBRID SUPERCONDUCTING CABLE

(71) Applicant: Electric Mayhem, LLC, Littleton, CO (US)

(72) Inventor: Glenn Auld Knierim, Littleton, CO (US)

(73) Assignee: ELECTRIC MAYHEM, LLC, Littleton, CO (US)

( * ) Notice: Subject to any disclaimer, the term of this patent is extended or adjusted under 35 U.S.C. 154(b) by 0 days.

(21) Appl. No.: 19/210,864

(22) Filed: May 16, 2025

(65) Prior Publication Data

US 2025/0279225 A1 Sep. 4, 2025

Related U.S. Application Data

(63) Continuation-in-part of application No. PCT/US2023/082772, filed on Dec. 6, 2023.

(60) Provisional application No. 63/386,205, filed on Dec. 6, 2022.

(51) Int. Cl.
*H01B 12/00* (2006.01)
*H01B 12/08* (2006.01)

(52) U.S. Cl.
CPC .................................... *H01B 12/08* (2013.01)

(58) Field of Classification Search
CPC ...................................................... H01B 12/08
See application file for complete search history.

(56) References Cited

U.S. PATENT DOCUMENTS

| | | | |
|---|---|---|---|
| 3,730,966 | A | 5/1973 | Aupoix et al. |
| 4,103,075 | A | 7/1978 | Adam |
| 5,057,489 | A | 10/1991 | Ohkawa et al. |
| 2004/0138066 | A1 | 7/2004 | Sinha et al. |
| 2012/0214675 | A1 | 8/2012 | Van Der Laan |
| 2013/0102474 | A1 | 4/2013 | Mukoyama et al. |
| 2014/0221213 | A1 | 8/2014 | Fukuda |
| 2021/0068320 | A1 | 3/2021 | Kawabe et al. |

FOREIGN PATENT DOCUMENTS

WO WO-2005029509 A1 * 3/2005 ............. H01B 12/08

OTHER PUBLICATIONS

International Search Report from parent PCT/US23/82772, May 30, 2024, 5 pages.
Written Opinion from parent PCT/US23/82772, May 30, 2024, 11 pages.

* cited by examiner

*Primary Examiner* — Pete T Lee
(74) *Attorney, Agent, or Firm* — FisherBroyles, LLP; Craig W. Mueller

(57) ABSTRACT

A hybrid cable generally comprising a superconducting material and a material consisting at least partially of a conventional conductor. In operation, the hybrid cable is chilled to superconducting temperatures, wherein current primarily passes through the superconducting material. If the superconducting material loses performance, e.g., is quenched, current will flow primarily through the chilled conventional conductor. In the event hybrid cable temperature further increases, the current will travel through the conventional conductor at its normal capacity.

29 Claims, 21 Drawing Sheets

HYBRID SUPERCONDUCTING CABLE

This application is a continuation-in-part of PCT Patent Application PCT/US2023/082772, filed Dec. 6, 2023, which designates the United States, and which claims the benefit of U.S. Provisional Patent Application Ser. No. 63/386,205, filed Dec. 6, 2022, the entirety of each being incorporated by reference herein.

This application is related to PCT Application No. PCT/US23/68945, titled Advanced Superconducting Power Devices, filed Jun. 23, 2023, which claims the benefit of U.S. Provisional Patent Application Ser. No. 63/366,927, filed Jun. 24, 2022, and U.S. Provisional Patent Application Ser. No. 63/374,321, filed Sep. 1, 2022, the entireties of which are incorporated by reference herein.

This application is related to PCT Application Serial No. PCT/US22/13662, filed Jan. 25, 2022, which claims the benefit of U.S. patent application Ser. No. 17/159,047, filed Jan. 26, 2021, published as U.S. Patent Application Publication No. 2021/0229946, which is a continuation-in-part of U.S. patent application Ser. No. 15/927,877, filed Mar. 21, 2018, now U.S. Pat. No. 10,899,575, issued Jan. 26, 2021, which is a continuation-in-part of PCT/US2016/053174, filed Sep. 22, 2016, and published as WO2017/053611 on Mar. 30, 2017, the entire disclosures of which are incorporated by reference herein. PCT/US2016/053174 claims the benefit of U.S. Provisional Patent Application Ser. Nos. 62/221,910, filed Sep. 22, 2015, U.S. Provisional Patent Application Ser. No. 62/242,393, filed Oct. 16, 2015, and U.S. Provisional Patent Application Ser. No. 62/243,966, filed Oct. 20, 2015, entitled the entire disclosures of which are incorporated by reference herein.

This application is related to U.S. patent application Ser. No. 14/569,314, filed Dec. 12, 2014, now U.S. Pat. No. 9,624,068, issued Apr. 18, 2017, which is a continuation-in-part of U.S. patent application Ser. No. 13/269,549, filed Oct. 7, 2011, now U.S. Pat. No. 8,936,209, issued Jan. 20, 2015, which is a continuation-in-part of abandoned U.S. patent application Ser. No. 13/114,012, filed May 23, 2011, which claims the benefit of U.S. Provisional Patent Application Ser. No. 61/347,374, filed May 21, 2010, the entire disclosures of which are incorporated by reference herein.

FIELD OF THE INVENTION

Embodiments of the present invention are generally related to a hybrid superconducting cable that can operate in a low-temperature superconducting mode or non-superconducting mode similar to a conventional, chilled or non-chilled cable.

SUMMARY OF THE INVENTION

Superconductors (sometimes referred to herein as "SC," which also refers to "superconducting") could one day be 100% efficient, allowing for the manufacture of innovative devices that can accommodate increased energy and power requirements in a compact package. High-temperature superconducting (HTS) devices, i.e., those operating at liquid nitrogen ($LN_2$) temperatures, are desired across many industries. However, commercially available advanced SC products, such as magnets, cables, and cable magnets, are virtually non-existent because existing superconductors, including those that can tolerate higher temperatures, are fragile, which those of ordinary skill in the art will appreciate makes it extremely difficult/expensive to incorporate into viable devices.

It is one aspect of some embodiments of the present invention to provide a hybrid cable generally comprised of electrically parallel copper shunt wound onto HTS, and/or HTS wound onto a copper shunt with various alternating and/or intertwined layering options, e.g., side by side. The contemplated HTS and copper windings are wound onto a copper, stainless-steel, or similarly used former core. In one operational regime, the HTS windings and the copper shunt are cooled with $LN_2$. In another operational regime, only the copper shunt is cooled. One additional benefit of a hybrid cable is that a copper shunt mitigates SC localized hotspots, addresses faults/quench concerns, and provides some power conditioning, thereby making the contemplated system—conventional conductor, SC conductor, and coolant-more reliable and robust. The hybrid cable and cable core can be used for any cable and cable-based use. Power cables include all electrical power transfer. Cable core examples include high current, cable magnet devices such as a fault current limiter (FCL), transformer, electric machines (motors and generators), accelerator magnets, and fusion magnets.

The hybrid cable embodiments of the present invention greatly decrease the weight and size of the entire cable system, which allows cable redundancy, further improving reliability. Although "copper" (Cu) is used herein, the inventions described herein contemplate using any conventional electrical conductor. Similarly, $LN_2$ is only one cryogen that can be used to achieve the benefits described herein.

A hybrid cable of embodiments of the present invention can be used in systems that require redundancy, e.g., an electric aircraft with performance requirements dictating the ability to travel a minimum distance, loitering, and safely landing. It is one aspect of some embodiments of the present invention to provide a hybrid cable optimal for use in an electric aircraft, and other dynamic systems, where reliability is a concern. Unlike motors in a traction ground electric vehicle (EV) that require high torque (requiring electrical current) from a low starting speed and across a large speed range, an electric aircraft motor, also known in the art as a "propulsor," often requires ranges of continuous high speeds (requiring a robust voltage range) because of the way propellers and air-breathing engines inherently operate. One embodiment of the present invention is a propulsion system capable of providing an electric vehicle hybrid mode that maintains power by boosting voltage beyond normal standards, thereby lowering current in the system cables, which is especially relevant for in-flight operations where torque is not crucial. This aspect also decreases power demand, such as reducing speed and having no fast-changing high-power options and increases the lift-to-drag ratio to support flight at lower speeds. Further, the contemplated cables can be overdesigned to accept extra current to maintain full system power with negligible cable mass or volume increase.

Electric aircraft that lose power during flight do not require design rated currents to maintain some functionality. More specifically, rotating propulsor components do not have to counter static friction and rotational inertia. Further, gravity, along with propulsor and aircraft momentum, benefited by hybrid cables at derated and superconducting baseline modes of operation, should be sufficient for operation-mission completion and/or return and landing. One embodiment of the present invention is an electric aircraft employing distributed electric propulsion (DEP), providing a large current distribution accommodated by many cables that meet propulsive power needs. Due to the number of cables already present for DEP, DEP will require less size and weight increase to support hybrid modes when HTS is not operational.

It is another aspect of some embodiments of the present invention to provide a hybrid cable comprised of fully transposed HTS windings that support cable electrical and thermal conduction, thereby increasing reliability. Those of ordinary skill in the art will appreciate that cable transposition generally refers to rearranging conductor position in a cable to minimize electromagnetic interaction. Transposition is common in power systems to enhance performance and reduce electromagnetic crosstalk. For example, in power transmission lines, transposition encompasses periodically swapping conducted positions. In cables, the conductors making up the cable are twisted about each other. Although common in conventional cables, providing a fully transposed superconducting cable with fragile superconductors and particularly with SC tapes is difficult, if not impossible, unless careful winding techniques are used, such as those disclosed in one or more of the patents and patent applications attributed to the applicant of the instant application.

The hybrid cable of one embodiment of the present invention builds upon full transposition (FT) technology previously concerned with winding delicate superconducting materials, wherein operational reliability is enhanced by including a conventional conductor. In one embodiment of the present invention, HTS and copper in the form of tapes are wound coaxially and fully transposed as electrically connected rings, combining to one parallel path per phase. In some embodiments of the present invention, the hybrid cable does not require a separate, non-phase connected EM shield located outside all phases, reducing costs, weight, and cable volume. Full transposition winding also minimizes SC and Cu induction and alternating current (AC) loss-based operational losses per phase and across phases. Further, FT gaps improve direct HTS and Cu conductor cooling, increasing reliability and cool-down and recovery times. More specifically, HTS and Cu FT group spacing is controlled to improve hybrid operation electrical and thermal conduction for added reliability and thermal to electromagnetic stealth.

To enhance FT effects, thereby reducing the Mode 0 operational losses, each successive layer of HTS and Cu is reverse wound with FT gaps. The Cu FT period is expected to be the same or less than the SC FT period to improve induced current canceling. Using tapes minimizes volume build and provides the largest material contact length for high current protection. Using FT winding techniques also lowers coupling losses per phase and across phases and provides the lowest Cu current restriction, allowing better fault current limiting and quench protection. HTS in a SC mode acts like an insulated HTS due to the non-HTS material layers surrounding the HTS. By leaving SC tapes non-insulated, the flat profile HTS allows current to quickly move to the Cu layers between HTS tapes.

In one embodiment, Cu tape is FT wound directly onto HTS FT layers, possibly between HTS layers, wherein the Cu tape insulation is designed to be broken during wind-on at selected HTS touch points to allow current sharing. Winding the Cu tape layers over HTS layers creates a compressive stress that pre-strains the HTS layers to partially balance external strains, such as cable mechanical motion attributed to winding stress and cryogenic contraction.

The Cu layers also help hold the FT HTS in place with the desired FT layer gaps, which counteract the movement of FT gaps that can occur at small cable bends. Even with many conductor layers, providing HTS and Cu FT with FT gaps allows a high level of safe cable bending. Beyond Cu insulation, phases may be electrically separated with a former with an inside radius that includes a dielectric layer, and possibly an outside radius that includes a dielectric layer, as the first layer. Due to the nature of FT winding, a separate, non-phase connected EM shield located outside of all phases may not be needed. Accordingly, cable cost, weight, complexity, and volume thereof are reduced.

As mentioned above, the SC and Cu can be wound for many formats, such as wires, tapes, and multifilamentary forms. SC and Cu solid, multiwire, filamentary (such as Litz), or FT tapes grouped into subcables for winding may be used as winding tapes to minimize volume build, provide the largest interconnected material contact length for high current protection, and, when fully transposed, provide the lowest Cu eddy current restriction during a quench. Such tapes are then wound onto a cable former as FT groups, but helix and other configurations are possible depending upon the need.

During all operational states, the HTS and Cu are directly cooled with $LN_2$ for improved thermal handling, e.g., improved thermal quench protection and recovery. Cryogen flow over and through all SC and Cu layer FT gaps enhances hybrid operation due to improved electrical and thermal conductivity and, hence, reliability through lowered losses and quench protection and recovery during all operational states. Cryogen flows through inner flow path(s) and returns via outer flow path(s), where a larger cable diameter can provide more flow volume and improved thermal intercept. This aspect of some embodiments supports thermal protection from the environment, which also supports a lower allowable temperature gradient between the cooling flows. Corrugations of the hollow core may be removed as a trade-off between lower friction flow and the improved cryo cooling it provides. In one embodiment, the Cu cable, or at least a portion thereof, is hollow or partially hollow to assist cryogen contact and flow throughout.

The amount of copper used in the contemplated hybrid cable can be sized such that loss of superconducting performance in the HTS continues to provide more power than a conventional cable because the resistance of $LN_2$ chilled copper is about ⅛ the resistance of copper at ambient temperature and this ratio improves with lower temperatures. Stated differently, if HTS windings cease operating in the superconducting threshold, available cryogen will cool the copper portion of the hybrid cable, and the contemplated system will continue to function more efficiently, wherein operational minimums are accommodated.

Hybrid Operation. In operation and apparatus design the hybrid mode applies to any cable, magnet, cable magnet, etc. based superconducting device whereas the hybrid cable is described herein. The hybrid mode of one embodiment of the present invention is capable of at least three modes: a full power mode, a derated mode, and a baseline mode. The hybrid mode is at peak performance during full power mode (Mode 0), wherein cryogen cools both the HTS and the conventional conductor. Accordingly, full power mode has inherent fault current limiting aspects, protecting against HTS quench, i.e., loss of superconducting performance, which may briefly occur locally but is not fatal to peak performance. The derated mode (Mode 1) occurs when the HTS has quenched or is not functioning at a peak level, but the conventional conductor and/or partial HTS are still functional. In the derated mode the cryo-cooled conventional conductor can handle more current than when the system is in the baseline mode (Mode 2), where the conventional conductor functions at ambient temperature. That is, $LN_2$ loss will still support operational minimums, allowing a safe electric aircraft landing and potential base return, for example. Accordingly, a resistive fault current limiting (FCL) and optional inductive FCL cable is provided that limits current spikes such as for each mode change that can damage the cable. Further, low electromagnetic (EM) radiation emittance/susceptibility capabilities of the hybrid cables of some embodiments of the present invention are desirable for military use as stealth characteristics are improved and power systems are protected from external electromagnetic pulse (EMP) attacks.

Buffer Vessel Cryo System and Process. The superconducting cables described herein may employ a cryogen system as described in U.S. patent application Ser. No. 18/968,115, which is incorporated by reference herein, that employs a low-pressure buffer volume, such as a vessel, configured to absorb higher system pressures.

SC Cable Terminations. The cables described herein may also employ the cable termination assembly described in U.S. patent application Ser. No. 18/968,115. Both ends of an SC cable must incorporate cable terminations for electrical and (potentially) cryogen connections. Two types of SC cable terminations are provided for each primary SC cable end, with and without cryogen ports for cryogen fill and flow. The SC cable terminations described herein are compact and expandable yet useful in dynamic environments, thus, configured for use in any mobile platform or equivalent use. The contemplated terminations also accommodate cryogen thermal contraction and expansion within the cable's termination shell without adversely affecting the HTS (e.g., little or no motion or stress) and do not have a cryogen gas reservoir within the SC cable termination when using cryogen liquid cooling.

The SC cable terminations incorporate moving busbars constrained to only axial motion and only move with the SC cable former or equivalent SC cable hard connection. Only the bus moves with the thermal motion of the former because HTS tapes comprise a rigid connection between the former and the moving bus, which protects the HTS tapes from shock and dynamic influences. Epoxy with a fabric ring interweaved between tapes, or equivalent components, is incorporated over the HTS tapes and tape ends to address vibrational issues, which also provides cooling flow protection.

The SC cable terminations are readily serviced with internal elements configured to be quickly replaced. That is, internal and external electrical connections are fully demountable and swappable, allowing for selective alteration of sizing and number of connectors. Both ends have funnels/donuts or equivalent shapes to assist in turning the cryogen flow and removing cryogen bubbles within the flow. Electrical separation comprised of G-10 dielectric positioned between SC cable termination external/internal distribution blocks addresses the concern of electrical arcing or ice buildup that creates an electrical shorting path. Some embodiments include SC termination shell internal walls incorporating electrical dielectric coatings, allowing a compact design. Conventional conductor and/or SC flex buses allow SC cable thermal expansion within the SC cable termination, and provides a vibration dampening and a focus point, which reduces bolt loosening occurrences.

Termination Electrical Lug. HTS electrical terminations are typically very large and heavy to compensate for thermal contractions and expansions mentioned above. Further, avoiding HTS tape damage when bending, soldering, clamping, etc. is extremely difficult. These issues are magnified for large/long/complex cables with many HTS tapes requiring electrical connections. For example, one of ordinary skill in the art will appreciate that expansion and contraction effects increase in proportion to cable length, and bend issues increase in proportion to the cable size and the number of stiff tapes. Longer cables are also associated with increased electrical losses, resistive heat generation, and device sizing thermal losses. Yet, it is desirable to provide small, light, and "non-lossy" electrical terminations, especially for mobile platforms. Accordingly, some embodiments of the present invention incorporate a shaped electrical lug configured to accommodate multiple angles of the HTS tape stacks during the SC device wind off process. The shaped electrical lug also allows for all tapes to be soldered at once or groups of tapes to be individually electrically connected. One embodiment also employs a conductor compression ring that is positioned about the lug, with or without soldering.

Power Boost Cables. Cables requiring extra current and/or voltage beyond their standard operational range to support system reliability or operational degradation, such as fault, concerns.

B Cancellation Comparison. Any 3-phase cable with balanced, magnetically connected phases can cancel a large portion of the magnetic fields across the 3 phases, but magnetic fields/flux (B) are never completely canceled due to geometric asymmetries and electrical imbalances. This canceling effect only works at the macro scale down the cable length, and localized losses can have significant sums after many partial phase periods. Further, for such a common phased axis cable, EM shielding effects will not occur where the outer phase interacts with the outside environment, and the inner phases interact far less, if at all.

It is, thus, one aspect of some embodiments of the present invention to provide an EM-shielded hybrid cable. By its very nature, an FT cable comprises a low inductance wind, wherein all balanced phases magnetically interact and cancel, even without phase-to-phase EM shielding. FT magnetics cancellation is far more localized to the FT twist pitch, greatly lowering all loss effects. For EM shielding per phase, all magnetics are isolated per phase leading to greatly lowering losses regardless of other phases and the environment. When the EM shielding of the phases are further electrically tied, such as during FT twist pitches, any induced emf (electromotive force) loss remaining will cancel due to the EM shield reflected phase balance across phases per the phase that each EM shield protects.

Cryogen Liquid Level Measurement. To further enhance reliability and redundancy, some embodiments of the present invention employ a guided wave radar (GWR) system for monitoring the liquid level in the dewar cryostat mentioned above. GWR has issues working with cryogen, which has a high dielectric constant. However, one type of GWR has a coaxial hollow cylinder around a predetermined measurement area, wherein inner and outer cylinders guide the radar waves to achieve a higher fidelity signal. Most commonly, these GWR cylinder guides have holes only at the top and bottom of the cylinder. One type of coaxial cylinder is perforated with holes along the length to allow fluid access for cases where there is a fluidic separation, such as oil and water separation, to remove false readings.

As one of skill in the art will appreciate, a mobile platform requires liquid cryogen levels to be assessed, wherein weight, manual, or regular electrical measurements cannot be relied upon. That is, a car's fuel sensor is generally comprised of an angled tube with perforated holes and an internal liquid level reading mechanism; there is no equivalent for cryo systems. Accordingly, some embodiments use the perforated outer cylinder of the GWR much like the fuel level gauge in a vehicle. The perforated outer cylinder will slow the fluid in and out of the cylinder. The contemplated GWR system will provide a fluidic average of liquid level when the liquid is moving, i.e., sloshing. Combining this type of cryogen level sensing with the option of dewar cross baffles will provide a method of lowering the fluidic motion to acquire a cryogen level in a moving vehicle.

Winding Direction and Contact Region. To enhance the FT effects, thus lowering the full power mode (also referred to as standard mode or Mode 0) operational losses, in one embodiment each successive layer of HTS and Cu layers are wound in the reverse direction and includes FT gaps. During a quench, all the electrical power transfers from the HTS to the Cu. The small contact area between the HTS external tape and Cu tapes becomes the worst-case fault location where too much power transfer at one time can damage the cable. The HTS to Cu layer contact region can be wound in the same or reverse direction to increase the contact length, which will assist with quench support. Further, contact overlap is affected by any varying twist pitch, twist angle, and contact length between the HTS and Cu layers, but it is assumed that the HTS and Cu will have the same pitch, with the only difference being the accommodation of layer twist angle to lower inductance.

FT Gap Winding to Lower Inductance. It is another aspect of some embodiments of the present invention to provide a hybrid cable employing full transposition windings with gaps that also lower inductance and AC losses in the SC and Cu layers. In operation, the source transient current produces a source magnetic field, and an emf is induced into the Cu, but the FT pattern cancels most of this emf and creates only a low current for the response magnetic field. So, only a fraction of the source magnetic field is canceled. In some embodiments of the present invention, however, uninsulated HTS in normal SC mode acts like insulated HTS because the tape-to-tape HTS is separated by non-HTS material layers surrounding the HTS. Insulated Cu tapes are helical, FT, or otherwise wound directly onto the uninsulated HTS FT layers to assume the power cable current during HTS quench. The SC and Cu tapes are wound in the opposite direction per layer, which creates the FT gaps in a mesh pattern, which further helps also create the FT gaps radially by having the SC and Cu only connect at the FT gap overlap points versus, with the SC and Cu touching continually from layer to layer. The wound FT gaps align across layers to separate in 3D the tape conductive paths with improved electrical insulation when $LN_2$ fills the FT gaps, which include gaps between the opposite wound layers. Per Faraday's Law, smaller FT gaps and fewer turns decrease induced current losses. The induced circular currents in the Cu and nearby HTS decrease for smaller B areas and do not superimpose the cable axis. Besides the needed quench current shorting, the SC and Cu of one embodiment are wound as tight as possible to lower capacitive effects and mutual inductances, similar to a conventional coaxial cable, which also enables using tapes, except for the tape's wide area, which increases capacitor effects versus a thinner area profile like a wire.

Direct Cryogen Cooling via FT Gaps. It is another aspect of some embodiments that due to FT gaps next to the cryogen flow, all SC and Cu layers are directly cryogen cooled which greatly improves thermal quench protection and recovery.

Reverse Wind Gap Bridge. As mentioned above, selectively modifying wind angle will provide gapped spacing that will maximize cryogen bathing of each conductor, regardless of conductor profile. By reversing a group wind direction between layers and providing an FT gap, subsequent outer tape layers will possess a "bridge" over the former between points where they rest on interior tape layers. This reverse wind gap bridge, which will be repeated with aligned gaps and bridges across tape layers, allows $LN_2$ to completely bathe the outer layer tapes at predetermined locations. The contemplated bridge effect is magnified for tape-to-tape separations for any tape type such as HTS and conventional conductors. Although the primary use of the reverse wind gap bridge is for liquid or gas coolant flow and/or conductive cooling access, it also helps control the location of layer-to-layer electrical connections and to improve electrodynamic canceling. The direct cooling across all HTS sides will minimize quench issues and improve quench recovery.

Uninsulated Cu with Gaps to Lower Inductance. Although some embodiments of the present invention employ insulated Cu, uninsulated Cu with gaps may be used. Uninsulated Cu wound next to the HTS without a separation will electrically short, acting like a continuous Cu conductor, which increases the cable inductance by not canceling the induced current.

Due to FT gap-aligned winding, the Cu tapes overlap all the way to the HTS to provide the shortest current shorting path from the HTS to all uninsulated Cu layers, thus supporting better HTS quench protection. The Cu-FT gaps cannot be too small, or the Cu tape sides will simply connect such as during bending and create a short down the cable axis without FT gaps, which removes the desired circular current effect. Separating the Cu with gaps versus a continuous piece of Cu lowers induced losses by setting up localized currents around adjoining and electrically interacting FT gaps. These induced currents from Cu FT gap to Cu FT gap cancel.

Insulated FT Cu to Lower Inductance. It is an aspect of some embodiments of the present invention to employ insulated, fully transposed copper to lower inductance. FT requires a separation of current intertwining to cancel magnetic flux (B) from a twisted FT group. The FT period is expected to be the same or less than the SC FT period to perform the proper induced current canceling. An electrical short to connect the insulated Cu tapes to the SC for quench current sharing is created by breaking the insulation of each Cu tape only where the Cu touches the SC. The power input into the Cu tapes for a worst-case, single location starting fault must be analyzed to confirm safe SC quench and power unloading to the Cu tape operation.

Single Phase SC (EM) Shielding. A hybrid cable of another embodiment of the present invention provides SC electromagnetic (EM) shielding that increases phase inductance and hence provides inductive quench and fault protection. More specifically, an FT wind provides a poor EM shield due to the low inductance. Accordingly, the hybrid cable of one embodiment of the present invention employs a separate phase-to-phase HTS shielding option that isolates the active HTS of a single phase magnetically from any adjoining phase conductive paths. This SC EM shield option can be useful with or without a Cu shorting path option. In both cases, a smaller radius SC EM shield location allows complete EM shielding for the least amount of SC, which is particularly useful when using wide HTS tapes.

One example of an EM shield entails winding a non-phase connected (possibly ground connected) helical wound HTS on top of separate electrically connected HTS and Cu FT groups, but with helical wind gaps that allow cryo flow into the FT gaps. A high inductance SC layer, perhaps comprised of a helical wind, will allow a high induced current to cancel the magnetics from the source. While in the full power mode, there is a limited resistive loss but a higher inductive loss. So, this option is deemed only acceptable for very short length cable runs like an electric vehicle (EV) or electric aircraft. The thin profile of the HTS provides a thin shielding layer to be equal to or less than the phase-powered HTS for induced B canceling purposes.

Multi-Phased SC (EM) Shielding with Shorting and Grounding. The contemplated single phase HTS EM shield becomes multi-phased canceling by connecting the ends of each phase shield. In doing so, the induced emf and currents are ideally balanced out of phase and will cancel, thereby creating an optimum EM shield. A slight induced current will exist that can be further eliminated by shorting the multiple SC EM shielding phases periodically down a cable, such as at cable joints, to cancel currents across phases. The multiple EM shielding phases can electrically float or also be connected to a mutual ground on one end, like a Wye configuration electrically tied to ground. Tying only one end is expected to remove ground loop issues, but a tie to ground on both ends may be possible and preferable depending on cable length. Placing a passive SC EM shield over all phases and connecting as described is also an option.

HTS Pre-Strain, Hold, and Bend. In some embodiments, Cu tape is wound about fragile HTS wire or tape. This aspect of some embodiments of the present invention helps to prevent cracks in the HTS. Cu tape layers on top of the HTS tape layers form a compressive stress which pre-strain the HTS layers to partially balance external strains such as cable mechanical motion from winding stress and cryogenic contraction.

The FT Cu layers also help hold the FT HTS in place with the desired FT gaps, versus bends closing the FT gaps. HTS and Cu FT winding, or equivalent bendable configuration, allows a high level of cable core and cable bending equivalent or better to equivalently sized conventional cables.

Thin Conventional Conductor Tapes Wound on SC. Conventional conductor shorting layer characteristics, such as tape width, strand diameter, etc., are chosen to be within that material's per phase eddy current value at the cryo temperature. Although Cu wire can be used and will assist with FT gaps, the thin (~10 mm max. for 60 Hz) profile of Cu tape is preferred to provide a better short to the SC during a quench, lower the overall cable radius build, and as a bonus, provide distributed compressive forces on the SC thus mitigating HTS damage concerns. Cu wire is only considered if better at minimizing induced currents during normal operation.

Outside Core Winding Section: A stainless-steel, Cu (for an outside conductor such as EM shield or electrical ground or neutral), etc., bellows, braid, or equivalent cylindrical type form or another format for winding on to such as multiple spiral cords is placed between phases and before the cryostat. This allows a dielectric standoff winding location to voltage protect outer layers such as the cryostat, outside of this location a cryogen external flow path for thermal intercept, outer EM shield winding location with an option of direct cryogen flow over the EM shield, for internal layers this allows cryogen direct contact flow over the conductive layers, a pressure vessel to contain and separately protect the winds of each phase for any cryogen liquid to gas state change, and easier pull thru into cryostat option for shorter length cables.

FT Winding Guides. Those of ordinary skill in the art will appreciate, especially after a review of the applicant's prior patent applications mentioned above, that winding advanced superconducting material is extremely difficult. This difficulty is multiplied when attempting to create a fully transposed SC cable or cable magnet. Accordingly, some of the hybrid cables described herein are wound by specialized machines that include angled transposition wheels that wind the SC so that transposed tape stacks are prevented from being placed forward or backward of the target location on the cable. Winding guides can include FT winding side guides to keep the wind tape groups from fouling between each transposition wheel and before wind on.

Winding guides may be used to guide the FT onto a preferred FT "wind on" point, e.g., the location on a former core, and to prevent "walking" of the FT wind on point, which could result in tape fouling. For example, pre-FT and post-FT winding guides in the form of cones can be used to guide the conductors radially inward or outward. These optional guides can be stationary or rotate with the FT wind. Winding cones are possibly used to set the tape wind angle and winding window maximum and minimum at the winding front, back, and sides cable former wind on locations. Each cone is possibly two halves of a cone made from a polymeric (possibly oil-impregnated urethane) or polytetrafluoroethylene (PTFE), e.g., Teflon® coated metal or a dynamic surface, such as rollers. A very precise winding window per FT group may be employed that limits winding location from all sides and rotates with the FT wind around the cable former. All winding guide options should help acquire a tighter packing factor without fouling. This contemplated winding method may also help control the locations of each transposed tape stack diamond and square pattern locations.

FT Winding Insulation Removal. In some instances, it is desirable to selectively remove insulation from an FT winding to accommodate HTS splices or various HTS tape-to-tape or conventional conductor wind overlap locations. Insulation removal can be achieved by using a dielectric cutter, reamer, scraper, thermal or chemical removal techniques, etc. Insulation removal can occur just before linear media (HTS or Cu) is introduced to a wind on location provided by the cable former. The winding machine may also predict where to remove insulation at a point away from the wind on location. Other forming techniques use linear media that do not employ insulation in preselected areas, wherein the linear media is wound precisely to align predetermined shorting locations.

Wrapped polyimide film, e.g., Kapton®, thermoplastic resins, e.g., formvar, HAPT (heavily armored polythermaleze), etc., dielectric insulated Cu or other non-SC conductor tapes will operate to cancel inductance at least partially in an FT group. Cu insulation is removed at a set location, often only at the radially innermost winding points that touch the outer layer of the previous FT wind or on the outermost locations where the next outer layer will contact. The Cu tape used in some embodiments is thick and able to withstand insulation removal by a mechanical device. For example, insulation removal can be achieved using a cone or similar mechanism that pushes the pre-wound conductors from radially outward and possibly into an FT winding guide that is radially inward. Any distance located or predetermined insulation removal options are possible, including allowing excessive Cu insulation removal, if the Cu tapes do not short in undesired ways.

FT Winding Sensor Process. A vision, laser profiling, or equivalent sensor may be incorporated into the winding process to confirm an appropriate FT wind that includes desired FT gaps. For example, one embodiment uses a vision sensor to pattern-identify the desired FT wind mesh pattern post-wind as well as any pre-wind dielectric removal. This information can be used to monitor the winding process, diagnose potential issues, and adjust winding parameters, such as adjustable winding guides and insulation removal or splice techniques, during manufacturing.

FT Winding Embedded Sensors. The cryogen flow paths and/or FT winding provide channels which can house items such as fiber-optic cables or wires, sensors such as quench or temperature sense, communication lines, etc.

Former Spool Wind On and Off Translation. A former wind on and off spool translation mechanism assists with winding a compact spool. More importantly, since a cable core is not protected on the final wind on spool like a completed cable, a former wind on and off spool requires a translating mechanism with relation to the former development and production line direction to minimize both the spool winding angle stress as well as the cable core compression stress experienced from successive spool layers.

Superconducting Tape Coating Insulation. The superconducting tape used in some applications is electrically insulated with a thermoplastic resin coating (e.g., Formvar), HAPT (a coating comprising a modified polyester basecoat and a polyamideimide topcoat), or equivalents thereof. The contemplated coating provides complete insulation and protection for the superconductor with no voltage tracking length. Such coatings are not used for high temperature superconductors such as rare-earth barium copper oxide (ReBCO), commonly wrapped with Kapton® tape, which can be prone to movement and gapping, adversely affecting insulative performance.

Thermal Insulation. As described in detail below, the HTS and Cu windings may be shrouded by thermal insulation that may comprise elongate annuli that define a cryogen flow path(s) and/or a vacuum region(s). However, in some applications, e.g., mobile applications, vacuum-based insulation systems may not be ideal for several reasons-weight, size, complexity, reliability, bendability, etc. Accordingly, the cable of one embodiment of the present invention uses aerogel, which one of ordinary skill in the art will understand to be a class of ultra-lightweight, porous materials made by replacing the liquid in a gel with gas, typically while preserving the solid network. Aspen Acrogels, Inc. manufactures one suitable aerogel under the name Cryogel® that can be formed into a flexible insulation blanket that works well in cryogenic conditions as it remains flexible at very low temperatures.

Those of ordinary skill in the art will appreciate that aerogel is very reliable, light, thin, flexible, and will not readily smoke or burn. However, aerogel insulating capabilities are less than that of a vacuum cryostat. Accordingly, some embodiments of the present invention combine non-vacuum cryogen insulation with vacuum thermal insulation, wherein the cryogen insulation material, such as multilayer insulation (MLI), glass bubbles, Perlite powder, aerogel wrap or beads, etc., is used in conjunction with a vacuum cryostat. The vacuum cryogen insulation can be located on the warm or cold side of a cryostat, within the vacuum cryostat, or some combination thereof. A combination of vacuum material-based thermal insulation provides a greater range of thermal insulation and increased liability. If vacuum is lost during operation, the material-based insulation will provide some protection against heat loss. This aspect is beneficial when reliability is critical, such as in ground/air/space vehicles, data centers, etc. that incorporate SC cables and/or devices.

In some embodiments, the aerogel is employed as an outside cable layer, which reduces system weight and volume, making such a configuration optimal for some mobile platforms. In other embodiments, an external armor/layer is placed around the aerogel as an outside cable layer. This configuration is considered optimal for short length, micro-grid applications where increased cable protection is important, and cable weight/volume is not as much of a concern. The external armor may be a metal jacket or non-metallic armor, such as common cross-linked polyethylene (XLPE).

Flexible Strap. Electrical conductor flexibility-required locations often comprise copper, or equivalent conventional conductor, flexible straps. One embodiment of the present invention instead employs superconducting (SC) flexible straps that connect moving buses of the SC cable terminations to static buses of the SC cable terminations. The SC flexible straps may be comprised of HTS and/or supercooled copper (or super cooled conventional conductor). A common use is SC cable cryogenic thermal contraction/expansion for any SC cable use case. Using SC flexible straps removes associated heating issues of copper flexible straps, thereby lowering cryogen cooling requirements and improving fault recovery performance.

One benefit of using tapes is that failures within a long cable length will be easy to locate, and repair by removing and changing tape types used in the SC flexible strap versus a larger SC device. The SC flexible strap may employ HTS tape having a quench capability lower than that of the SC device, which will increase the chance that failure will occur at the SC flexible strap, making the location thereof easier. For example, the plurality of HTS tapes of the flexible strap may have at least one tape that is thinner, i.e., of a different character and apt to fail first. In operation, the cable span would remain operational after partial failure, but the failure would be apparent, allowing repairs before complete flexible strap failure. Indeed, characteristics of the unique tape could be actively or passively monitored to provide a complete failure lead time and give operators ample time to address the issue. For example, the voltage of the unique tape could be assessed at predetermined intervals. Operators would be notified if voltage moved from 0 to open circuit, thereby indicating partial failure. One benefit of this configuration is that an extremely high current from a lightning strike or fault current, which would ruin the cable, can be accommodated because the failure will be focused in an easy-to-fix area. Full cable functionality can then be remedied by replacing the affected SC flexible strap. One of skill in the art will appreciate that the benefits of SC flexible straps are very apparent in longer cables. This failure location technique can be used for any cable or magnet SC device. Conventional conductor and/or SC flex buses not only allow SC cable thermal expansion within the SC Cable termination but also provides a vibration damper and focus point which is a technique for lowering bolt loosening.

SC Cable Manufacturing Process. One of ordinary skill in the art will appreciate that manual or automatic manufacturing of SC cable is very difficult because the nature of the constituent materials. Manufacturing processes can be further complicated using aerogel or other insulation provided on the outside of the SC cable. Further, incorporating a cryostat may be particularly problematic because it is often preferable to weld such rigid materials about the SC cable, an issue that becomes even more apparent when extended cable lengths are considered. Because the heat associated with welding may cause localized damage to the SC cable, from HTS to electrical and thermal insulation used, some embodiments of the present invention employ welding protection along the cable-cryostat axial length and at radial connections, joints, and terminations. The contemplated protection also shields dielectrics and protects all internal elements from damage that may occur during forming, i.e., the creation of bend-facilitating or strengthening corrugations at predetermined locations or along the entire cable length. A friction stir weld SC device embodiment is a cold type of weld that will not require as much if any protection.

The manufacturing process of one embodiment of the present invention comprises placing a stainless steel sheet beneath an SC core. The stainless steel sheet can be corrugated before or after the welding process. The sheet metal is funneled and bent around the weld location. A fixed thermal protective layer (e.g., a curved carbon sheet) is then placed at the weld location between the sheet weld and the SC. The sheet metal is then welded to form a fixed and static location along the length of the cable. This method allows for infinite cable length.

Although the foregoing contemplates a system that comprises conventional conductors wound about superconductors, those of ordinary skill in the art should appreciate that the opposite can be true wherein superconductors are wound about conventional conductors without departing from the scope of the invention. Indeed, the superconductors and conventional conductors may be interlaced. Further, although a single phase cable is primarily described herein, one of ordinary skill in the art should appreciate that multiple phases comprised of superconducting/conventional conductor layer groups are possible.

It is, thus, one aspect of some embodiments of the present invention to provide a hybrid cable, comprising: a first layer comprising superconducting material formed as a fully transposed winding; a second layer comprising superconducting material formed as a fully transposed winding about the first layer; a third layer comprising superconducting material formed as a fully transposed winding about the second layer; a fourth layer comprising a conventional conductor formed as a fully transposed winding about the third layer; a fifth layer comprising a conventional conductor formed as a fully transposed winding about the fourth layer; a sixth layer comprising a conventional conductor formed as a fully transposed winding about the fifth layer; and an inner wall spaced from the sixth layer that defines an annulus between an outer surface of the sixth layer and an inner surface of the inner wall, the annulus configured to provide a fluid flow conduit.

It is another aspect of some embodiments of the present invention to provide a hybrid cable, comprising: a first layer comprising conventional conductor formed as a fully transposed winding; a second layer comprising conventional conductor formed as a fully transposed winding about the first layer; a third layer comprising conventional conductor formed as a fully transposed winding about the second layer; a fourth layer comprising a superconducting material formed as a fully transposed winding about the third layer; a fifth layer comprising a superconducting material formed as a fully transposed winding about the fourth layer; a sixth layer comprising a superconducting material formed as a fully transposed winding about the fifth layer; and an inner wall spaced from the sixth layer that defines an annulus between an outer surface of the sixth layer and an inner surface of the inner wall, the annulus configured to provide a fluid flow conduit.

It is still yet another aspect of some embodiments of the present invention to provide a hybrid cable, comprising: a first layer comprising superconducting material formed as a fully transposed winding; and an electrical induction altering or canceling second layer associated with the first layer.

It is an aspect of some embodiments of the present invention to provide a method of transmitting electric current, comprising, providing a hybrid cable comprising a first layer of superconducting material formed as a fully transposed winding, and an electrical induction altering or canceling second layer positioned about the first layer; chilling at least a portion of the hybrid cable to a predetermined temperature; directing current through the first layer and second layer; and wherein electric current transmission is capable of: a first, full power mode, wherein current travels primarily through the first layer, a second, derated mode, characterized by partial or full quench of the first layer, and wherein current primarily travels through a chilled second layer, and a third, baseline mode, wherein current is transmitted primarily through the second layer.

The embodiments of the present invention described herein and shown in the figures can be combined with, or integrated into, the inventions described in the patents and patent applications listed above.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

BRIEF DESCRIPTION OF THE DRAWINGS

The accompanying drawings, which are incorporated in and constitute a part of the specification, illustrate embodiments of the invention and, together with the general description of the invention given above and the detailed description of the drawings given below, serve to explain the principles of these inventions.

Figure 1A:
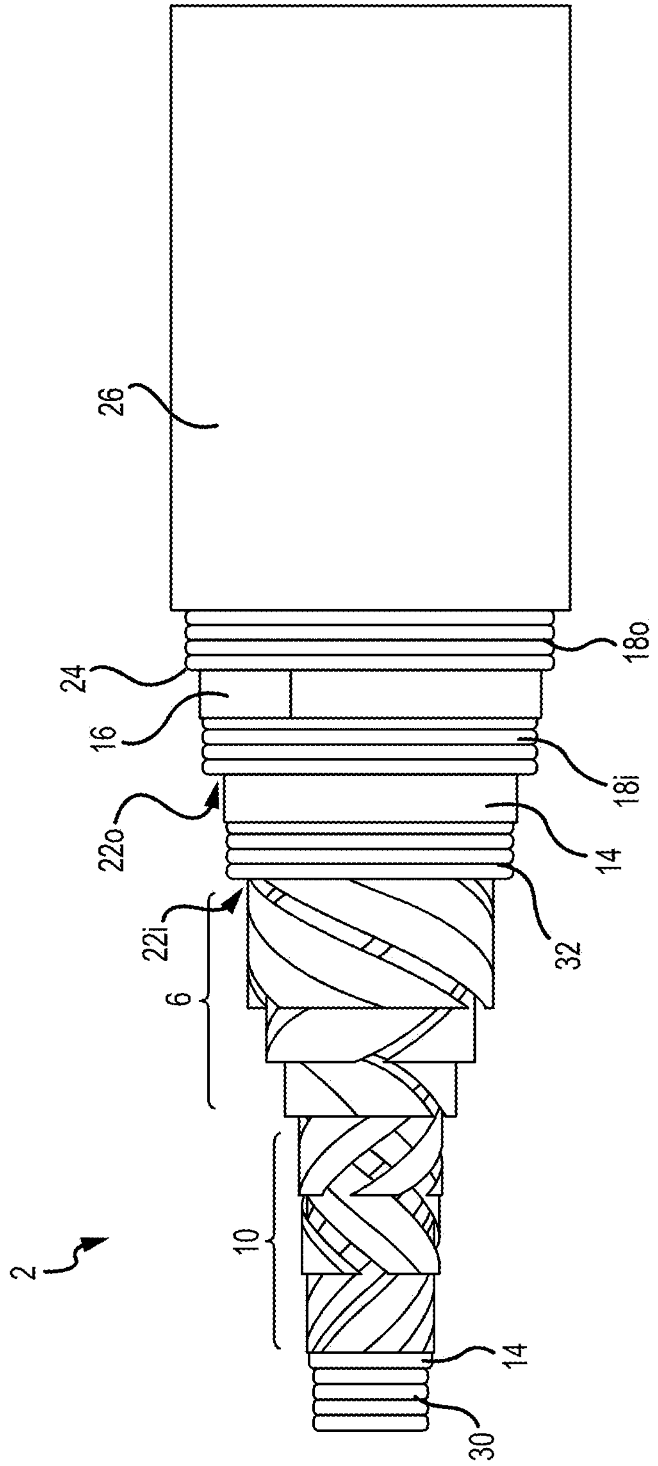
FIG. 1A is an elevation view of a single phase hybrid cable of one embodiment.
Figure 1B:
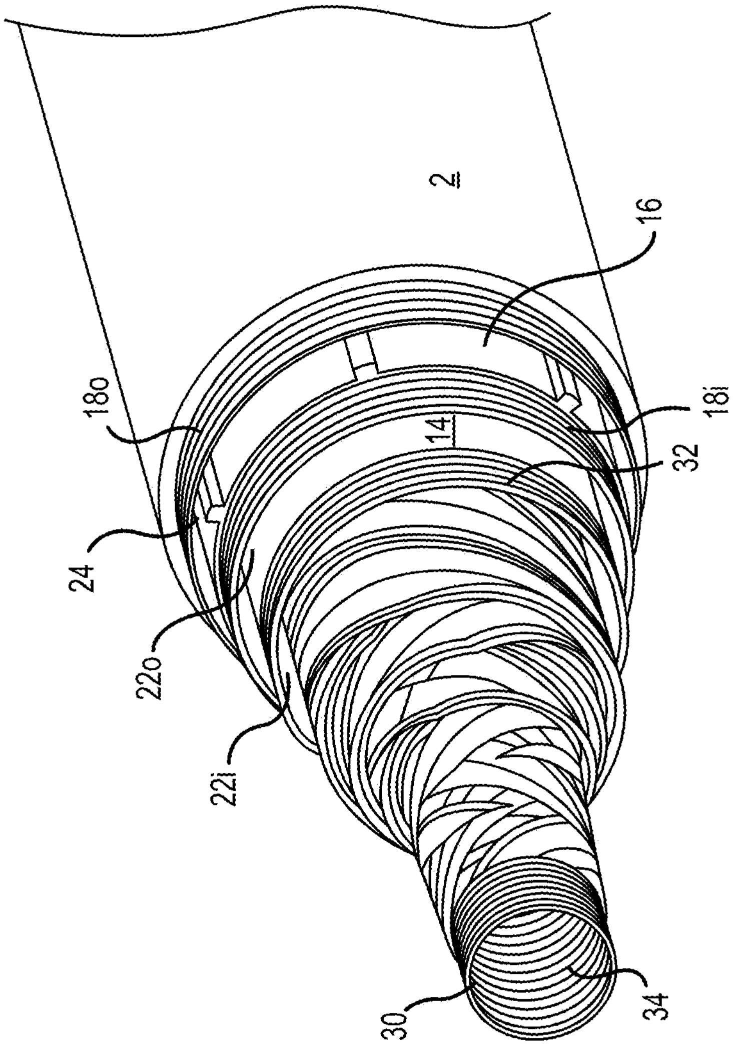
FIG. 1B is a partial perspective view of the hybrid cable shown in FIG. 1.
Figure 1C:
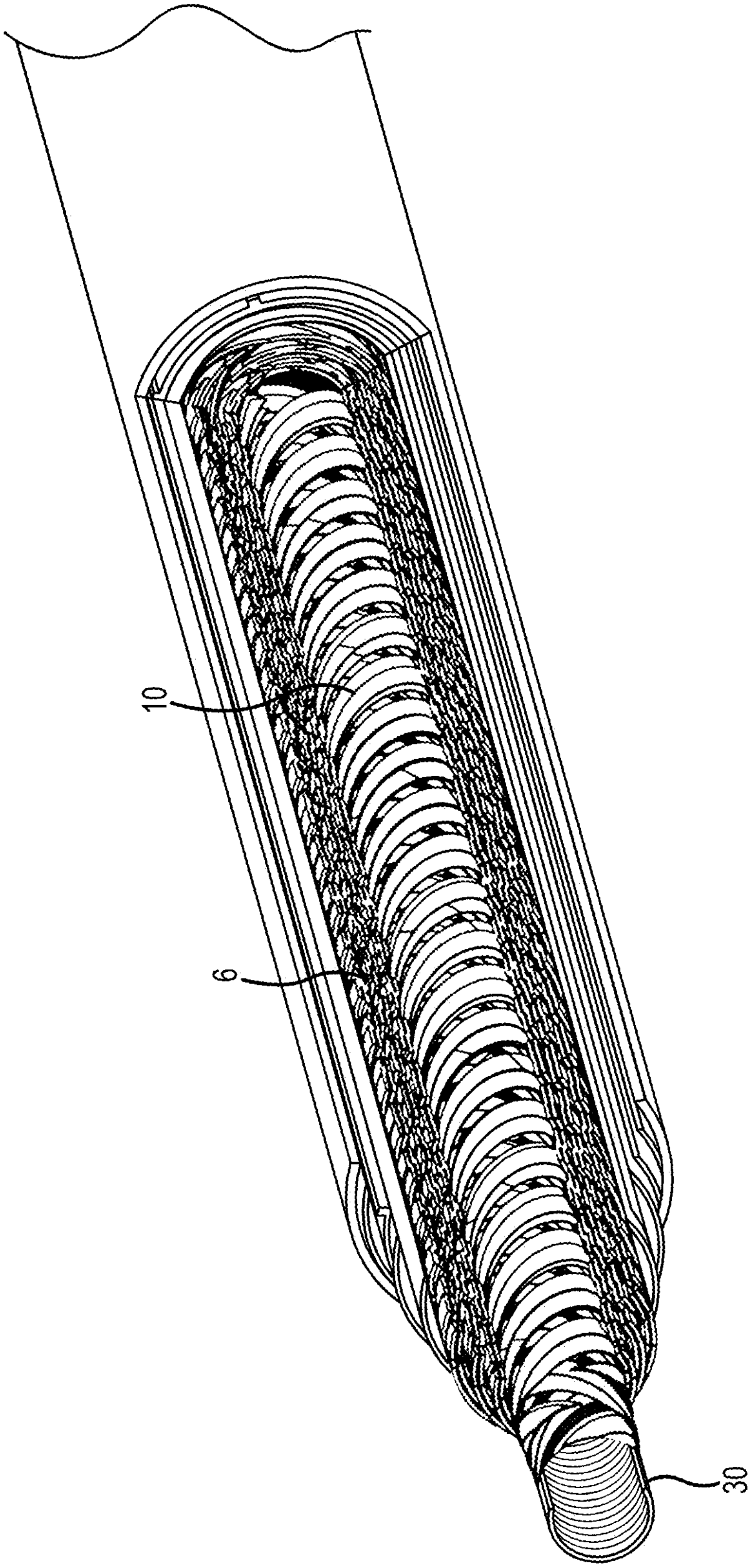
FIG. 1C is a partial cross-sectional view of the hybrid cable shown in FIG. 1B.
Figure 2:
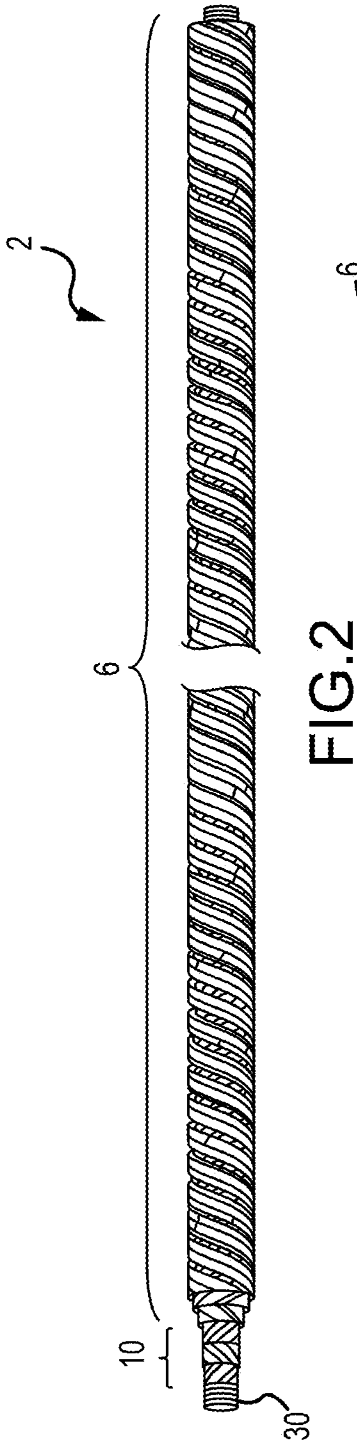
FIG. 2 is an elevation view of the hybrid cable of FIG. 1 with outer portions removed for clarity.
Figure 4:
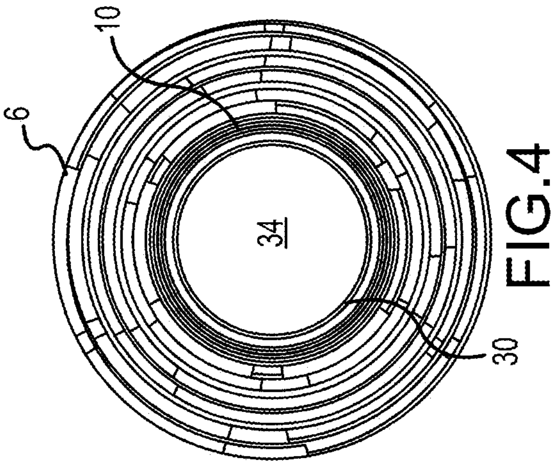
FIG. 4 is an end view of the hybrid cable shown in FIG. 1.
Figure 3:
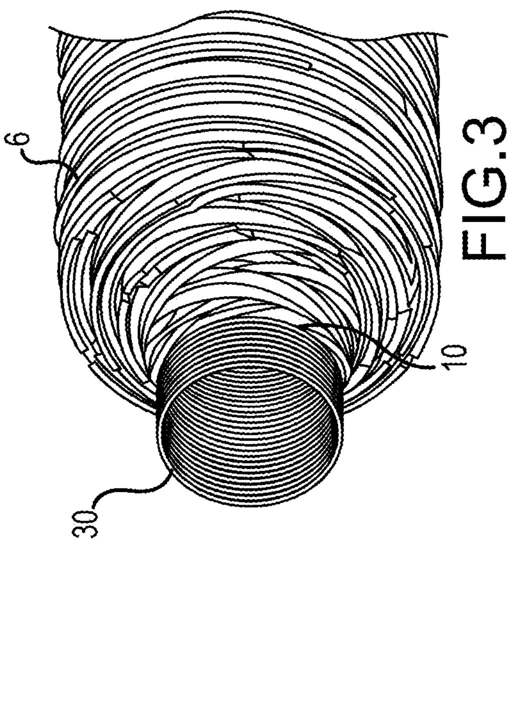
FIG. 3 is a side perspective view of an end of the hybrid cable shown in FIG. 1.

The following component list and associated numbering found in the drawings is provided to assist in the understanding of one embodiment of the present invention:

| # | Component |
|---|---|
| 2 | Hybrid cable |
| 6 | Conventional conductor |
| 10 | Superconducting conductor |
| 14 | Dielectric |
| 16 | Thermal insulation |
| 18 | Cryostat vacuum wall |
| 22 | Cryogen flow path |
| 24 | Vacuum region |
| 26 | Cable jacket |
| 30 | Former |
| 32 | Core winding wall |
| 34 | Inner cryogen flow path |
| 38 | SC linear media |
| 42 | Conventional conductor linear media |
| 46 | Full transposition gap |
| 50 | Superconductor lateral edge |
| 54 | Conventional conductor lateral edge |
| 58 | FT channel |
| 70 | EM shield |
| 74 | Inner conductor layers |
| 78 | Outer conductor layers |
| 84 | Winding machine |
| 88 | Winding guides |
| 100 | Cable termination assembly |
| 104 | Cryogen port |
| 108 | Bayonet assembly |
| 112 | End cap |
| 116 | Electric terminal distribution block |
| 200 | Termination Electrical Lug |
| 204 | SC Tape |
| 208 | Conductor Recess |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-9 show a hybrid cable 2 of one embodiment of the present invention generally comprised of at least one layer of conventional conductor 6, e.g., copper (Cu), wrapped about at least one layer of superconducting conductors 10, e.g., high-temperature superconductors (HTS). Those of ordinary skill in the art will appreciate that the Cu can be in the form of complicated windings comprised of tape or wire (e.g., a conductor capable of induction canceling), Cu mesh, braided Cu, etc. The following description will focus on HTS and Cu, but other superconducting materials, such as low-temperature and medium-temperature superconducting material and other conventional conductors, may be incorporated into the embodiments of the present invention described herein without departing from the scope of the invention. The HTS and Cu layers may alternate and/or intertwine or include more layers of one or both types without departing from the scope of the invention. The HTS and Cu windings may be shrouded by one or more layers of dielectric 14 or thermal insulation 16 that may be encircled by cryostat vacuum walls 18 that are spaced to define elongate annuli that define cryogen flow paths 22 and a cryostat vacuum region 24. Finally, an outer jacket 26 may be included. Electrical insulation may be wrapped about cable walls (18 and/or 22) and/or on inside surfaces thereof. The hybrid cables of some embodiments of the present invention may also include electromagnetic (EM) shielding layers, which will be described in further detail below.

In one embodiment of the present invention, the superconducting layer 10 is comprised of full transposition (FT) HTS, further comprising three reversing direction layers of HTS and three FT groups per layer and for HTS tapes per FT group. The conventional conducting portion 6 is also comprised of a fully transposed winding of three reversing direction layers of Cu, with three fully transposed groups per layer and four Cu tapes per FT group.

In some embodiments, the internal layers of the hybrid cable 2 are wrapped about a former 30, which, if hollow, defines an inner cryogen flow path 34, and in some embodiments, work with one or more cryogen flow paths 22. All cryogen flow paths are used to maintain the HTS and Cu at a predetermined temperature. In one embodiment of the present invention, cryogen is pumped through the inner cryogen flow path 34 and returns to a pump that is in communication with a cryogen reservoir (not shown) by way of one or more cryogen flow paths 22. The cryogen flow directly contacts (or contacts the conducting linear media comprising the SC and/or Cu conductors through a dielectric) the layers of conventional conductor 6 and superconducting conductors 10, such that they are maintained at a predetermined temperature. One or more cryogen flow paths 22 may be supported by a rigid, semi-rigid, or flexible cylindrical section. In the embodiment presented in FIGS. 1A and 10, for example, an outer cryogen flow path 220, which may be surrounded by thermal insulation 16, is positioned about an inner cryogen flow path **22*i* located near the conventional conductors 6 and an optional outermost core winding wall 32. Core winding walls 32 can possess an integrated EM shield, support an EM shield, act as a cryogen barrier, provide a cryogen flow path, and/or accommodate one or more superconducting and/or conventional conductor windings (see, FIG. 13). The core winding wall also reacts internal pressure if the cryogen's state changes to gas. An outermost cryostat vacuum wall 180 supports the vacuum region 24 and provides a location for the external jacket 26. This figure also shows the optional dielectric layers 14 about the former 30**.

The former of some embodiments includes a plurality of openings that allow cryogen to flow through gaps in the HTS and Cu windings, wherein the cryogen is ultimately maintained within the hybrid cable by an inner cryostat vacuum wall **18*i*. In other embodiments of the present invention, the former 30 is not continuous or fully solid, wherein an inner surface of the innermost conductor layer, comprising HTS or Cu, is directly exposed to cryogen. In some embodiments of the present invention, the former is solid or semi-solid, comprised of a conventional conductor. In other embodiments, the inner cryogen flow path 34, cryogen flow path(s) 22**, and/or channels provided in the FT windings, which will be described below, accommodate other items, such as fiber-optic cables or wires, sensors, such as quench or temperature sensors, communication lines, etc.

Figure 5:
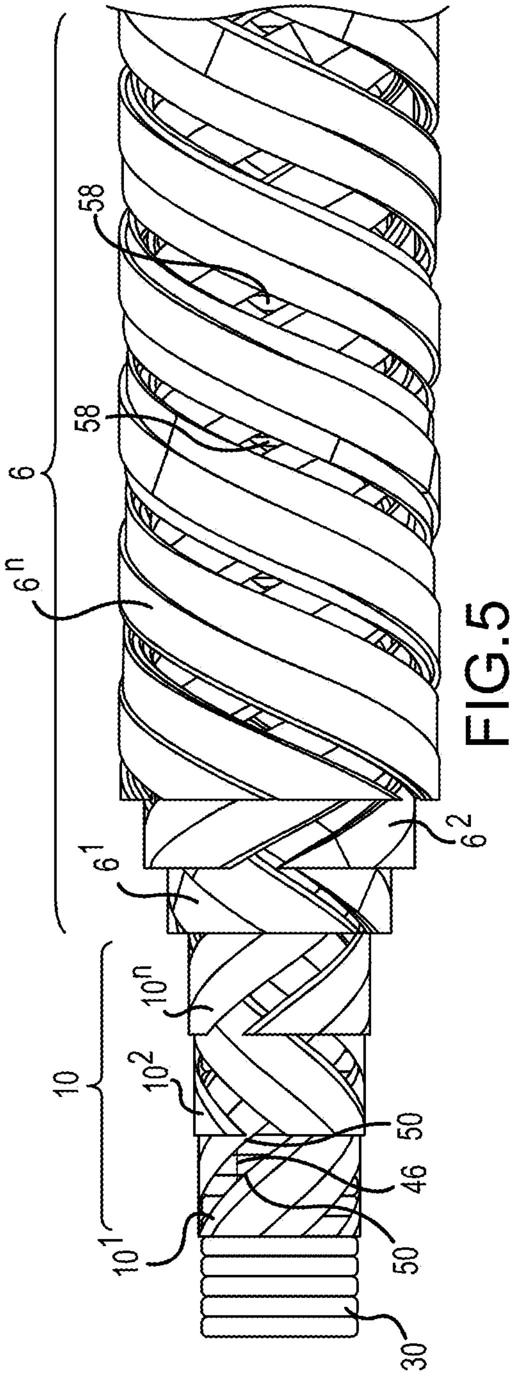
FIG. 5 is a detailed view of FIG. 2, showing a cable former, layers of superconducting material, and layers of conventional conductors.
Figure 6:
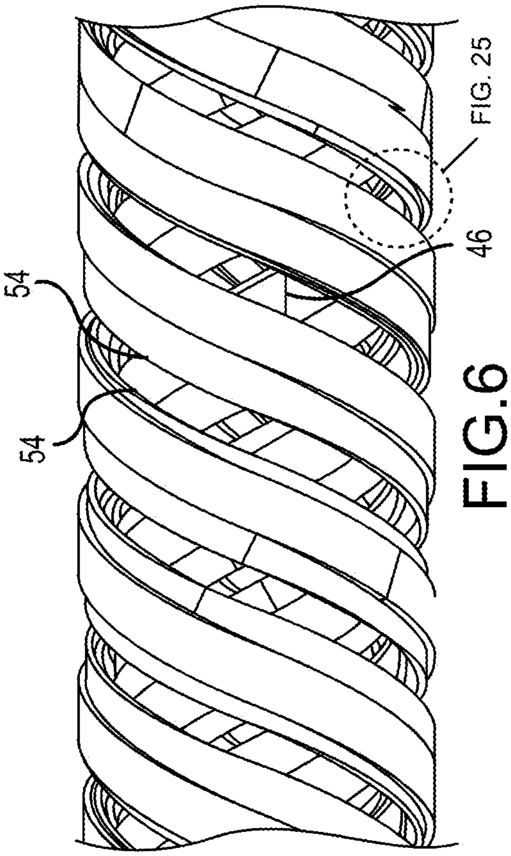
FIG. 6 is a detailed view of FIG. 5, focusing primarily on the outer layers of conventional conductors.
Figure 7:
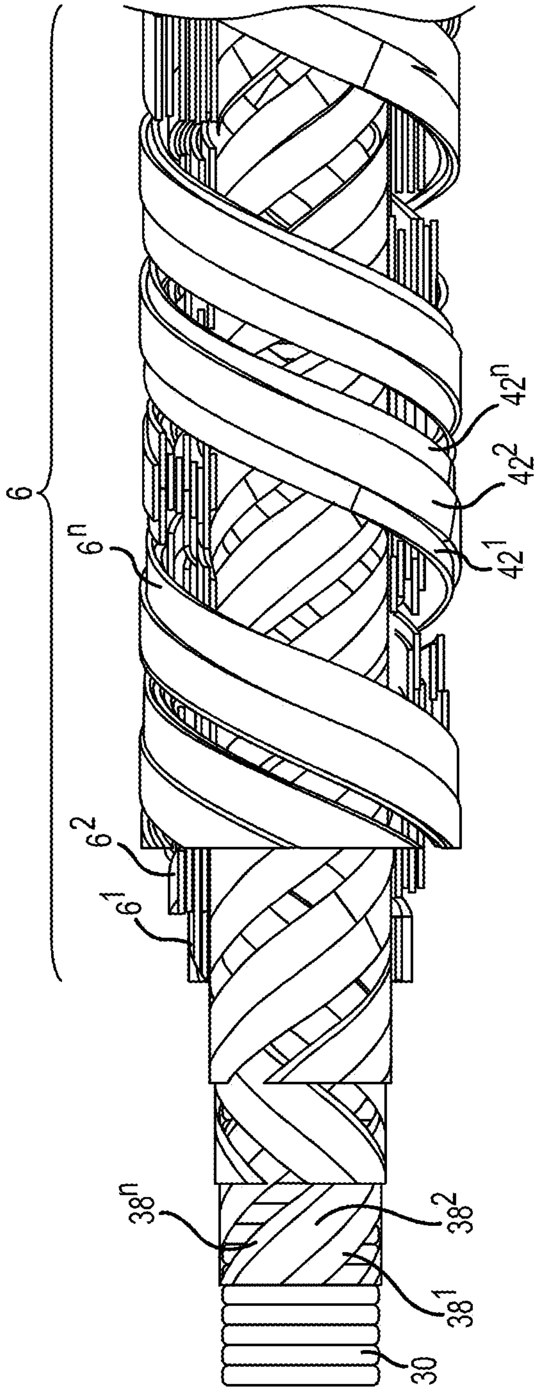
FIG. 7 is another detailed view of FIG. 2, wherein internal layers of all but a portion of one wind layer of the conventional conductors are shown in cross-section.
Figure 8:
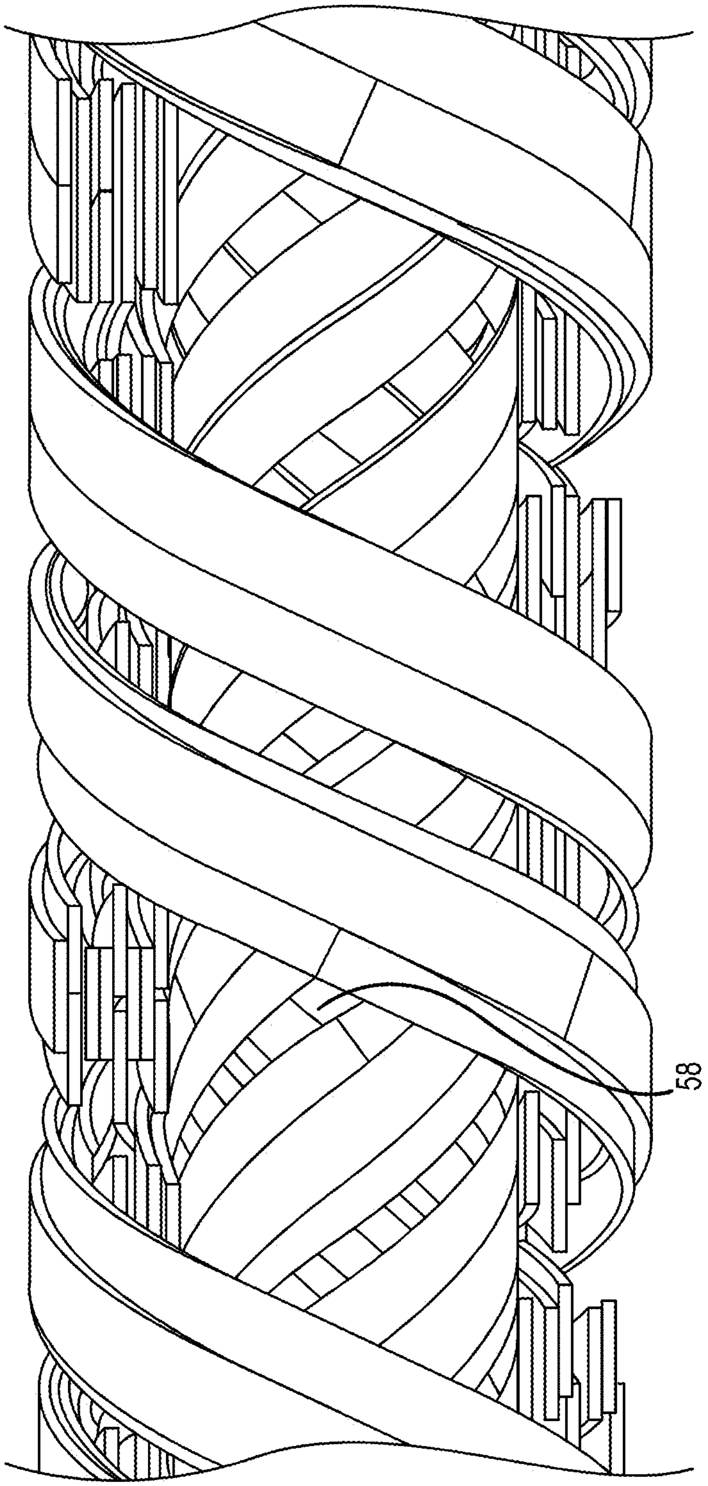
FIG. 8 is a detailed view of FIG. 7.
Figure 9:
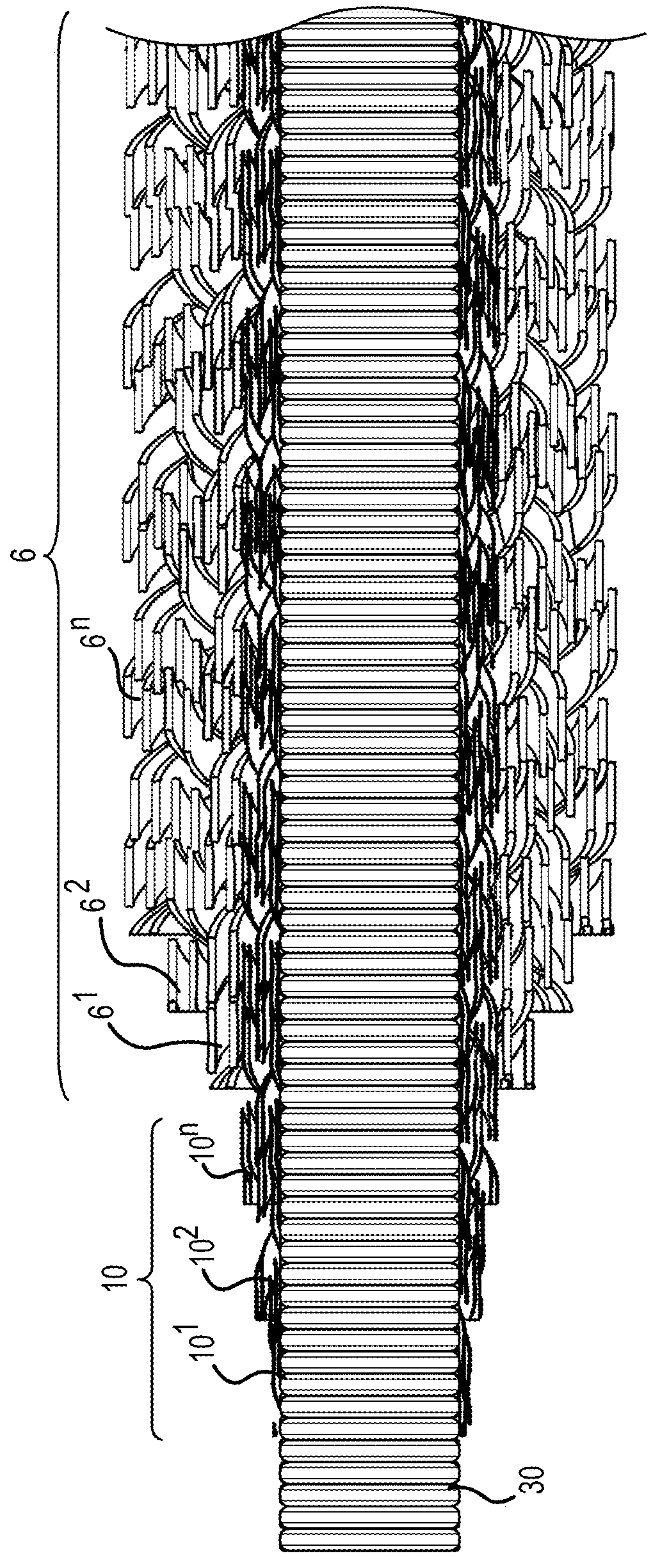
FIG. 9 is a cross-section of FIG. 5, showing conductor layers radially expanded.

FIGS. 5-9 show the conductor windings found in the hybrid cable of one embodiment of the present invention. Here, the HTS windings 10 comprise a plurality of layers, i.e., a first layer $\mathbf{10}^1$, a second layer $\mathbf{10}^2$, . . . $\mathbf{10}^n$, with each successive layer wrapped about the previous layer. Further, each HTS layer may comprise a combination of SC linear media, i.e., $\mathbf{38}^1$, $\mathbf{38}^2$, . . . $\mathbf{38}^n$. Similarly, the Cu layers comprise a plurality of layers, i.e., a first layer $\mathbf{6}^1$, a second layer $\mathbf{6}^2$, . . . $\mathbf{6}^n$, with each successive layer wrapped about the previous layer. Each Cu layer may comprise a combination of conventional conductor linear media, i.e., $\mathbf{42}^1$, $\mathbf{42}^2$, . . . $\mathbf{42}^n$. The SC or conventional conductor linear media may comprise wire, tape (as shown in FIG. 5), a combination of wire and tape, or any other commonly known conductor configuration.

The hybrid cable shown in FIGS. 5-9 employed is fully transposed, wherein a plurality of gaps 46 are provided in one or more HTS layers and/or one or more Cu layers. The gaps 46 provide air and/or cryogen paths that facilitate hybrid cable cooling to maintain a predetermined temperature. The gaps 46 may be created during the manufacturing process by carefully controlling media wind on locations wherein lateral edges 50 of the HTS are spaced, and lateral edges 54 of the Cu are spaced (see, for example, FIG. 7), wherein the spaces defined by the separated lateral edges 50, 54, create radially extending channels 58 during the winding process.

Figure 10:
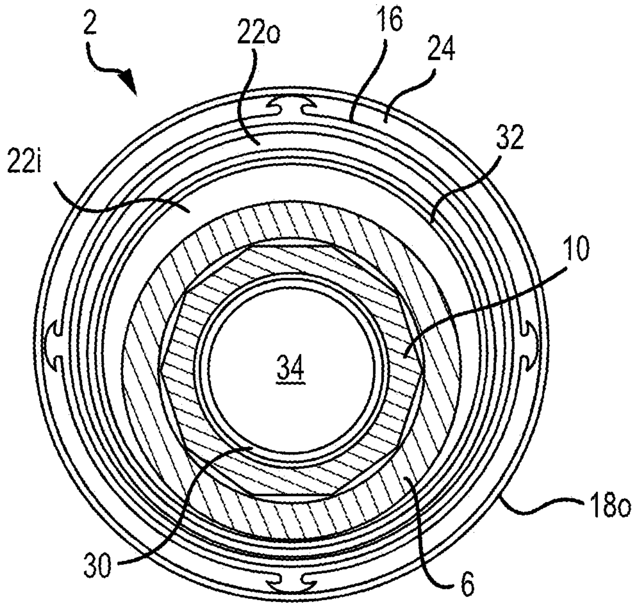
FIG. 10 is a cross-section of a single phase hybrid cable of one embodiment of the present invention.
Figure 11:
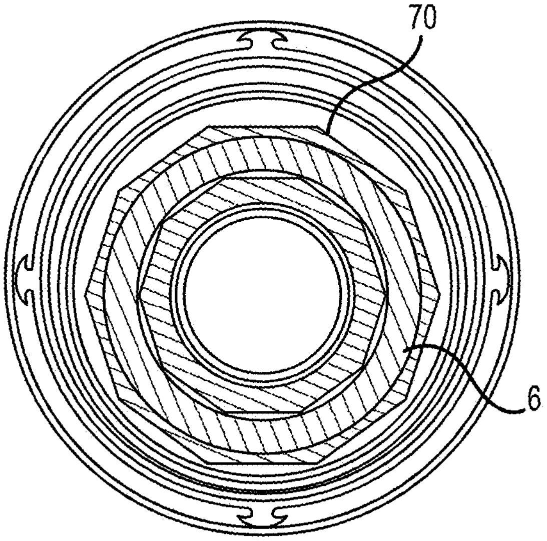
FIG. 11 is a cross-section of a single phase hybrid cable similar to that shown in FIG. 10, wherein an EM shield is provided.

FIGS. 10 and 11 show a single phase hybrid cable 2 having the above-described HTS layers and Cu layers 6 wrapped about the HTS 10 and a former 30. Here, the inner cryogen flow path 34, one or more internally disposed cryogen paths 22, and the outer cryostat vacuum wall 18 that provides a vacuum region 24 are shown. As mentioned above, in some embodiments of the present invention, electromagnetic (EM) shielding is not required because of the canceling effects provided by some fully transposed wrappings. However, some embodiments of the present invention employ an EM shield 70 next to the Cu layer 6 on the opposite side of the active HTS layer 10. Cryogen flowing through the cryogen paths is in direct contact with the EM shield, which is also the case for a two-phase cable described below.

Figure 12:
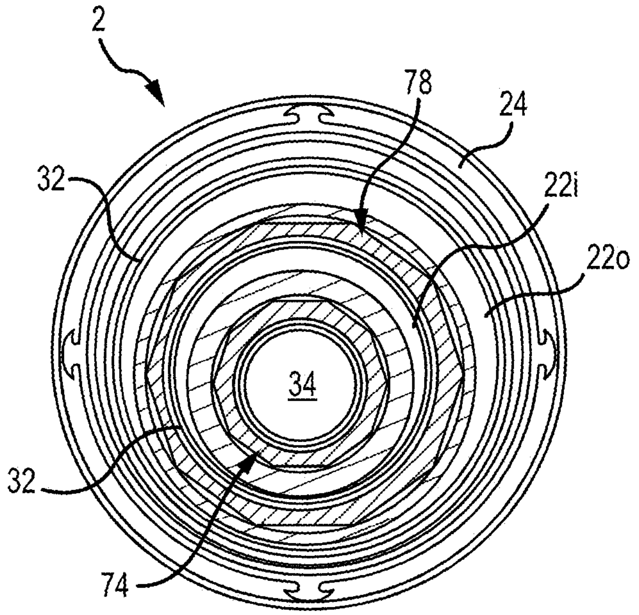
FIG. 12 is a cross-section of a two-phase hybrid cable of one embodiment of the present invention.
Figure 13:
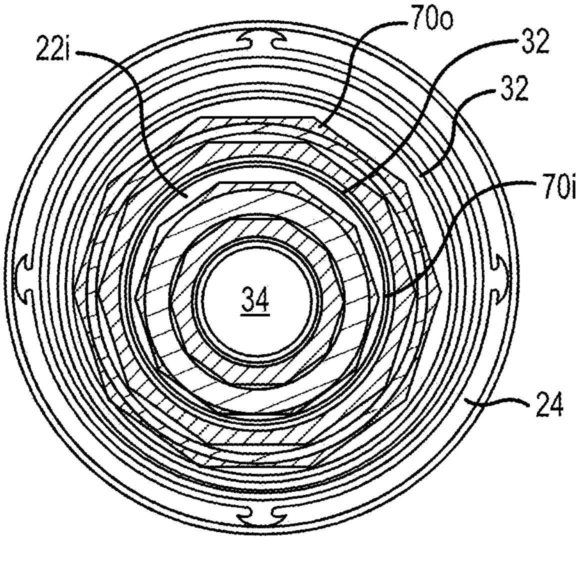
FIG. 13 is a cross-section of a two-phase hybrid cable similar to that shown in FIG. 10, wherein an EM shield is provided.

FIGS. 12 and 13 show a two-phase hybrid cable 2 having the above-described HTS layers and Cu layers 6 wrapped about a former 30. As mentioned above, for a multiphase cable, the core winding wall 32 forms the basis of a new electrical phase winding former. This embodiment of the hybrid cable also employs the inner cryogen flow path 34, one or more internally disposed cryogen flow paths 22, and an outer vacuum region 24. Here, the two phase hybrid cable includes an inner conductor layer 74 and an outer conductor layer 78 comprised of HTS and/or Cu, wherein at least one of the inner conductor layer 74 and outer conductor layer 78 are surrounded by respective inner **70*i* and outer 70*o*** EM shields positioned next to the phase Cu layers on the opposite side of the active HTS layers.

Figure 14:
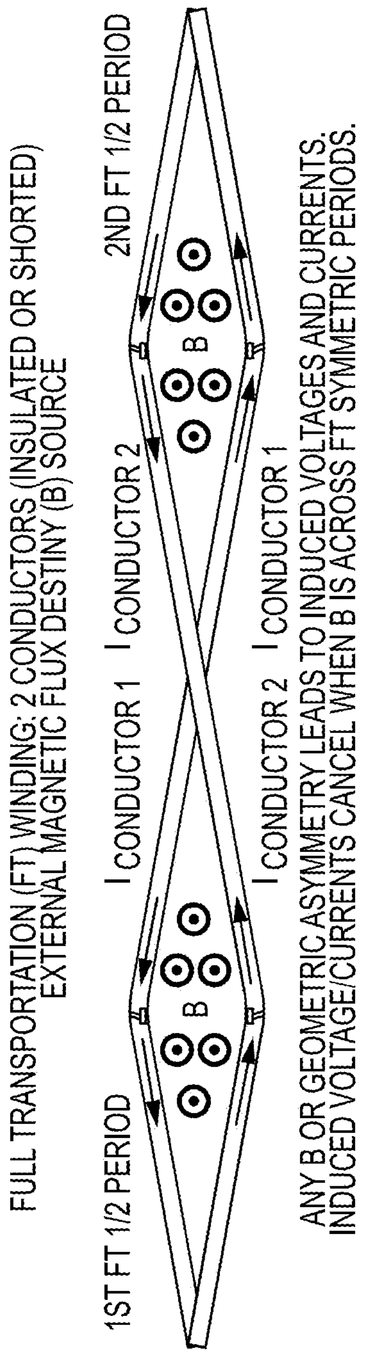
FIG. 14 is a schematic of the full transposition winding-induced electromagnetics employed by some embodiments of the present invention.

FIG. 14 illustrates how aligned FT gaps create electromagnetic conductive paths. Here, induced circular currents in the Cu and nearby HTS decrease for smaller B areas and do not superimpose along the cable axis. The SC and Cu of one embodiment are wound as close together as possible to lower capacitive effects and mutual inductances, similar to a conventional coaxial cable, which also enables using tapes.

Figure 15:
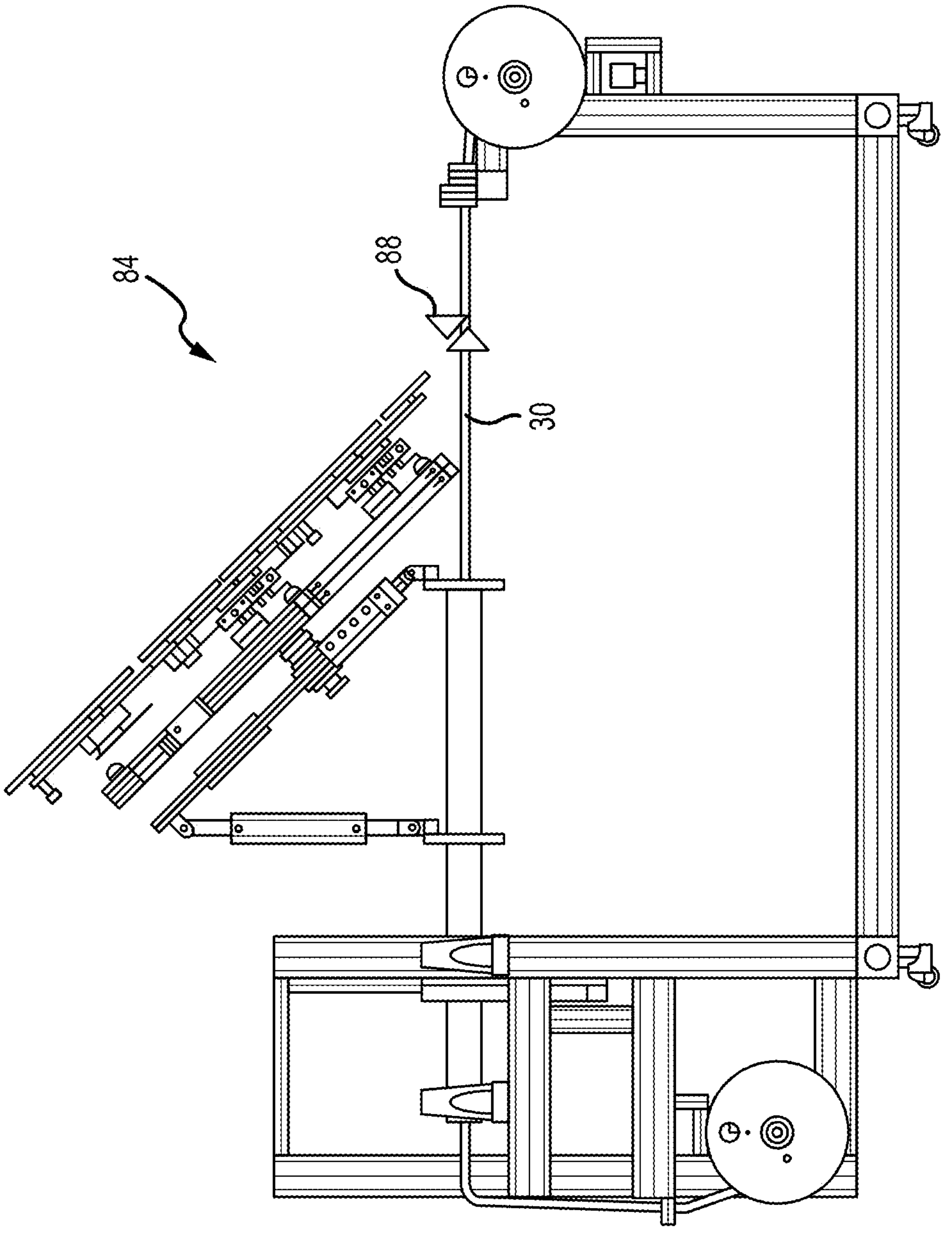
FIG. 15 is a detailed side view of one embodiment of the winding machine single full transposition wheel winding the hybrid cable with winding guides.

FIG. 15 is a cable winding machine 84 that may be used by some embodiments of the present invention to create a hybrid cable. The contemplated winding machine 84 is similar to other wind machines developed by the applicant and described one or more of the patents and patent applications referred to above. In operation, the winding machine 84 winds delicate linear media about a the former 30, wherein one or more winding guides 88 are employed to ensure the wound media is being placed in a predetermined fashion. In one embodiment, the winding guides 88 are conical. In another embodiment, the winding guides are set to remove Cu insulation in a predetermined manner.

Figure 16:
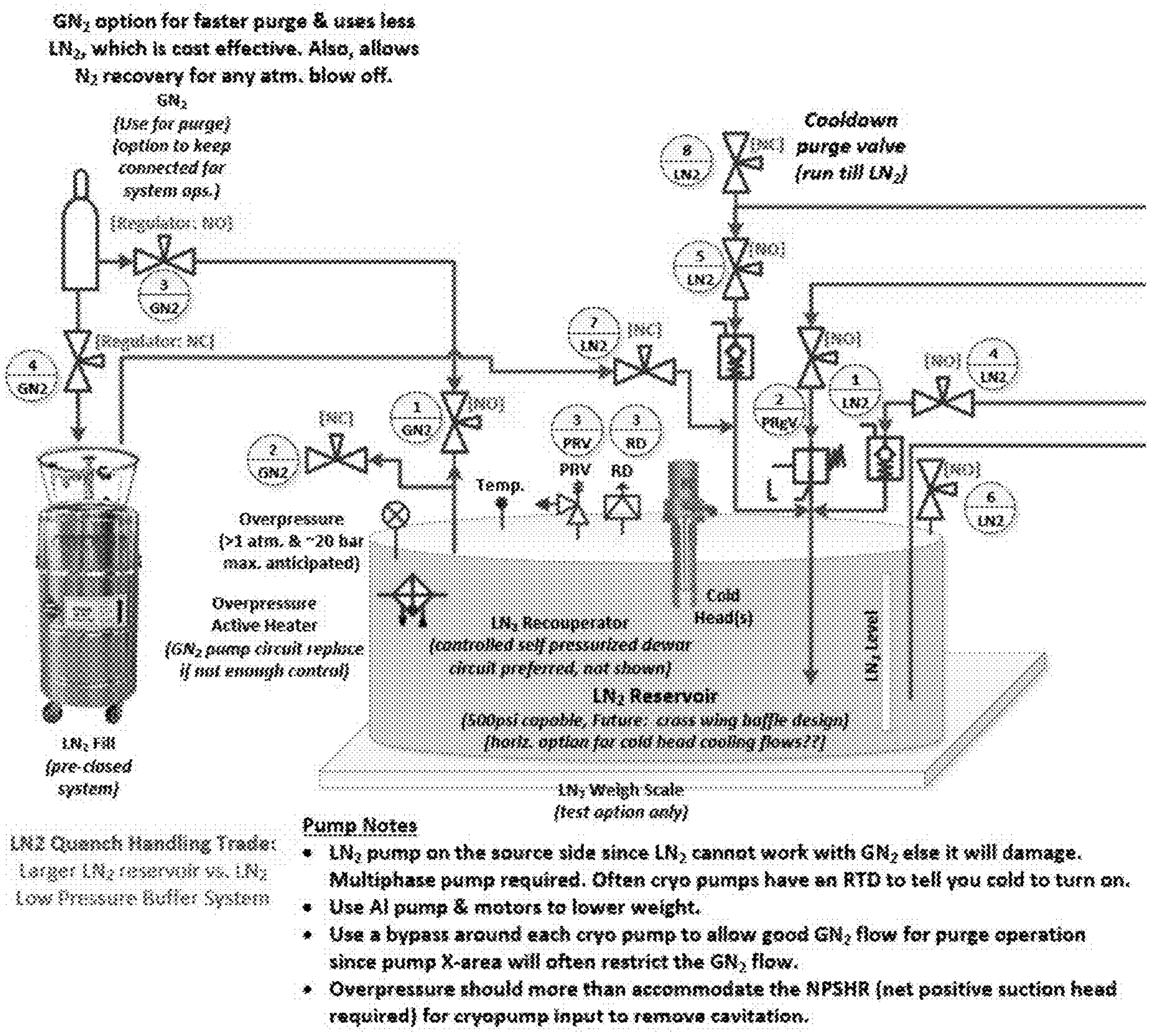
FIG. 16 is a schematic of a closed loop cryogen system that includes a buffer dewar.
Figure 16:
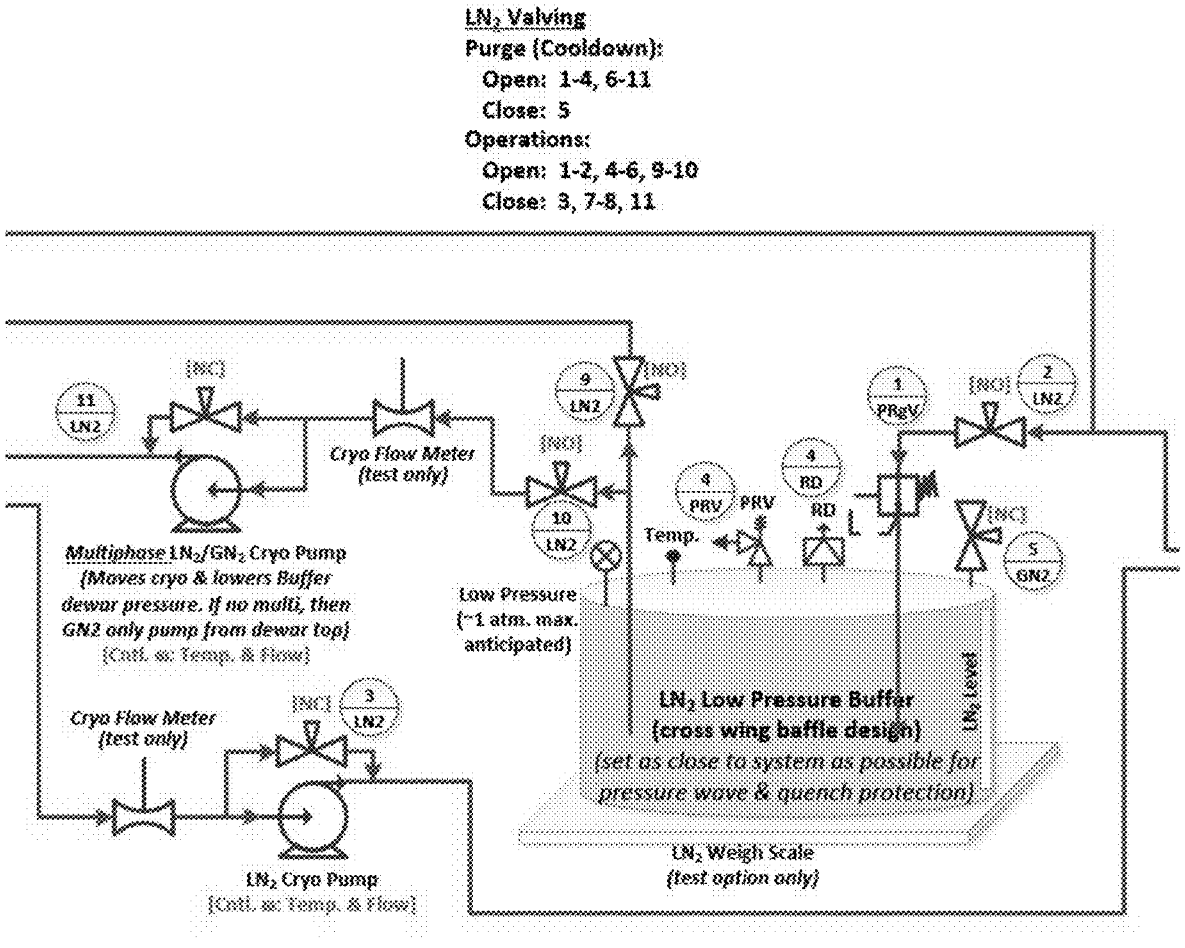
Figure 16:
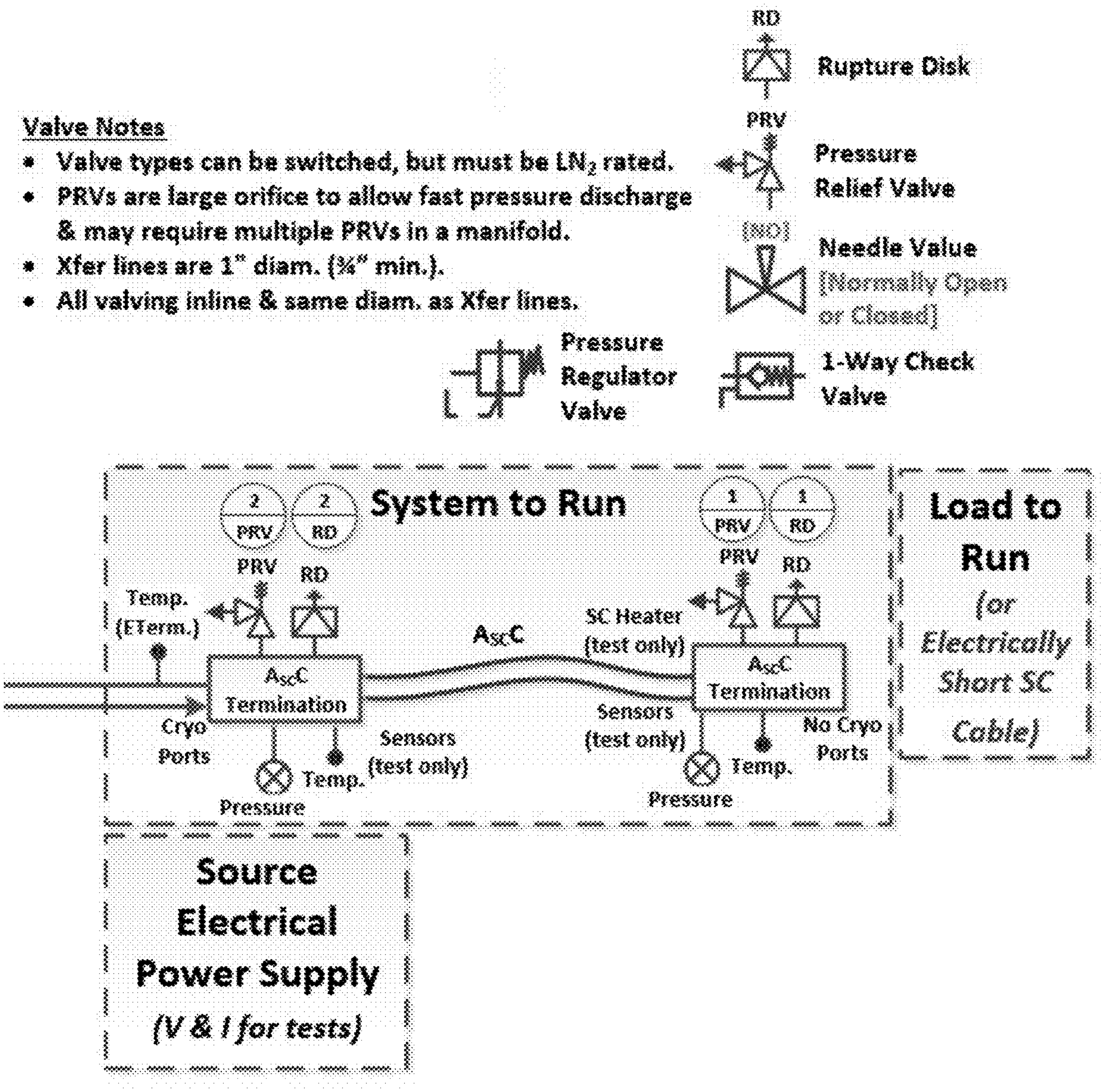

The cables described herein require a cryogen system to maintain a predetermined temperature. FIG. 16 shows a cryogen system of one embodiment of the present invention that includes a low-pressure buffer volume, such as a vessel, configured to absorb higher system pressures. The compact and light vessel is maintained at a lower pressure than the surrounding cryogen system and is especially useful for a fully enclosed system. The vessel's primary task is to accommodate a pressure increase with associated volume expansion of liquid cryogen to gaseous cryogen that occurs during a superconductor quench, for example. The low-pressure buffer vessel, thus, increases gas reservoir volume and area to lower system pressure from a quench or another high-pressure event, thereby protecting equipment from high pressure events.

The buffer vessel, such as a dewar cryostat, is maintained at a lower pressure than the connected cryogen system. Passive pressure relief valves (PRV), controlled valving, etc., are used for pressure control actions. For the PRV embodiment, the buffer vessel is associated with input and output PRVs only open at desired PRV pressures maintained above the common system pressure. Multiple PRVs associated with the system may be employed via multiple lines or at least one manifold to accommodate fast pressure changes. Such a system can be designed as an open-loop or closed-loop cryogen system to support dynamic and shock environments of mobile platforms, including aircraft flight angles, and not lose any cryogen to the environment. A closed-loop cryogen system is beneficial or critical for most long-term use cases. A cryogen low pressure buffer may alleviate the need for a cryogen source on a longer SC cable run at each cryogen input location. At any time, the buffer dewar may push excess liquid cryogen or gaseous cryogen to the reservoir(s) for reliquefying. The buffer vessel can also perform the cryogen reliquification if a cryogen cold head is added.

Figure 17:
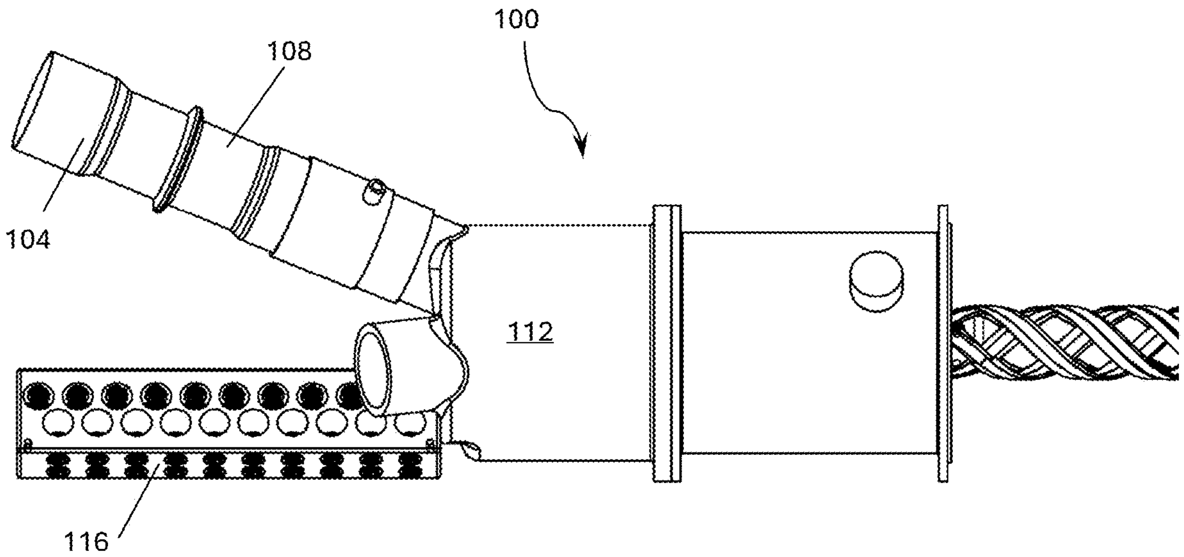
FIG. 17 is a perspective view of a cable termination assembly of one embodiment of the present invention, wherein a cable cryostat has been removed for clarity.
Figure 18:
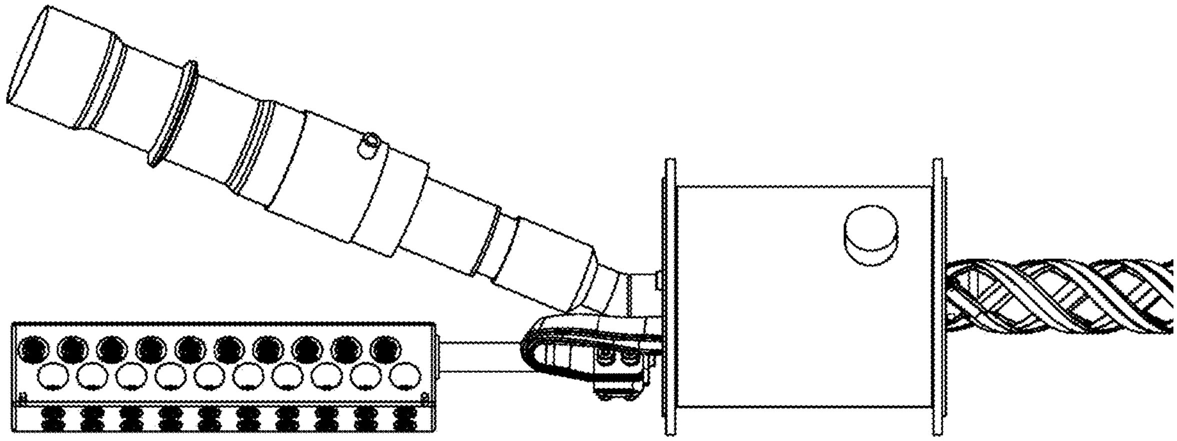
FIG. 18 is a perspective view of the cable termination assembly, wherein the end cap and cable cryostat have been removed.
Figure 19:
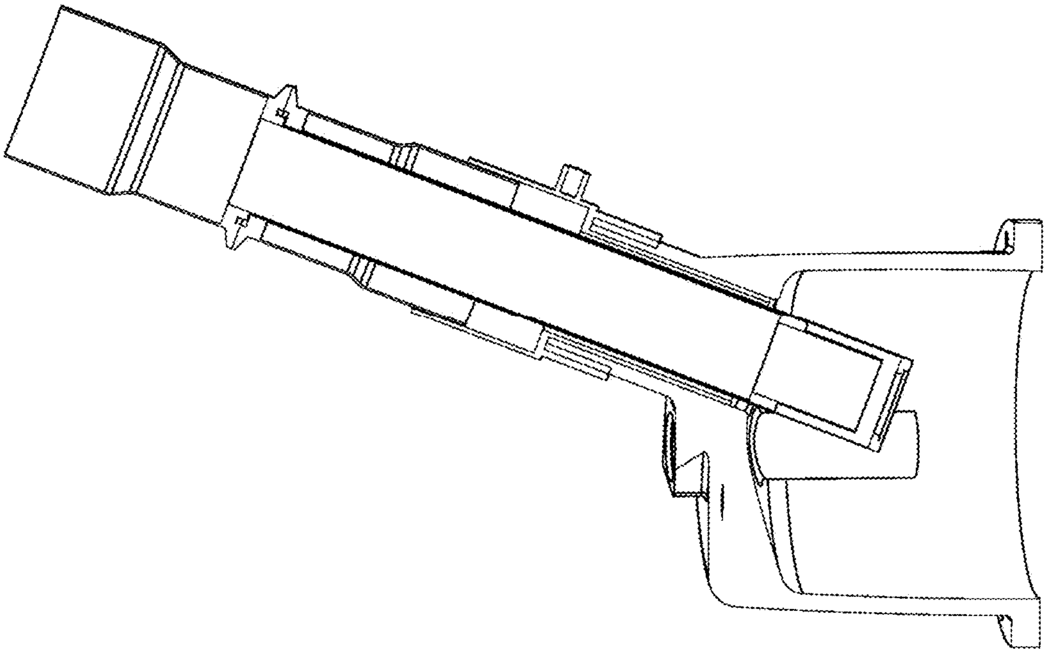
FIG. 19 is a cross-section of the stainless steel bayonet assembly connection to an end cap.
Figure 20:
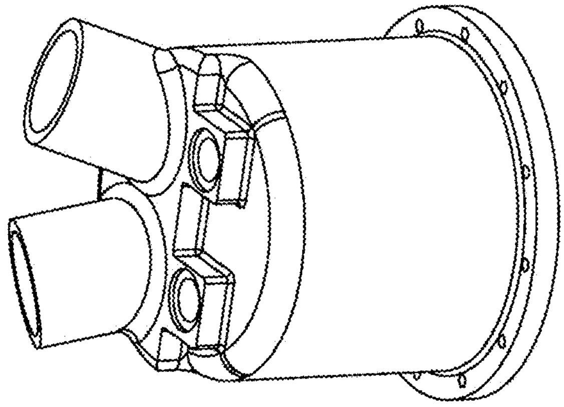
FIG. 20 is a perspective view of an end cap.

FIGS. 17-22 show a cable termination assembly 100 used with some embodiments of the present invention. FIG. 17 shows a cryogen port 104 with attached bayonet assembly 108. Bayonet assembly 108 contains female half welded to an adapter that threads to G10 end cap 112. The male half slides into the female half, seals with an O-ring, and attaches with a circumferential clamp (not shown). An electrical terminal distribution block 116 made from one piece of conventional conductor, e.g., copper, comprises a terminal rod of the distribution block that penetrates the cryogen wall, e.g. G10 end cap, and internally connects electrically internally to electrical elements, e.g., by a two-part circumferential clamp that also attaches to flexible braided electrical conductor, commonly HTS or copper as shown here, straps. Outside of the G10 end cap, the terminal rod becomes a rectangular block with holes sized for wire gages of conventional power cables and threaded inserts at 90 degrees to these cable holes that provide for set screw locking of cables. FIG. 18 shows the cable termination with the end cap removed to expose the gasket that seals the electrical terminal distribution block and the continuing path for cryogen flowing into the bayonet assembly on its way into a SC-wrapped metal hose former shown on the right. The electrical connection to the flexible strap described above is also shown here.

Figure 21A:
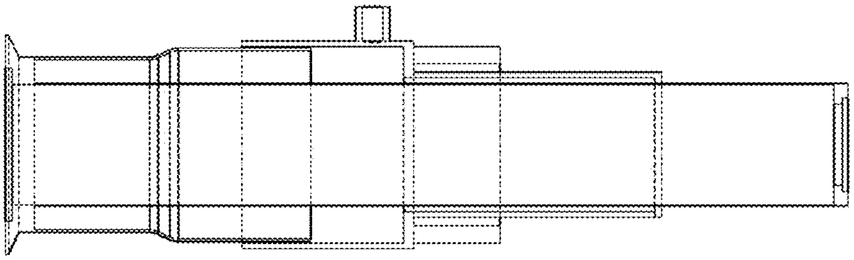
FIG. 21A is a view of a bayonet fitting.
Figure 21B:
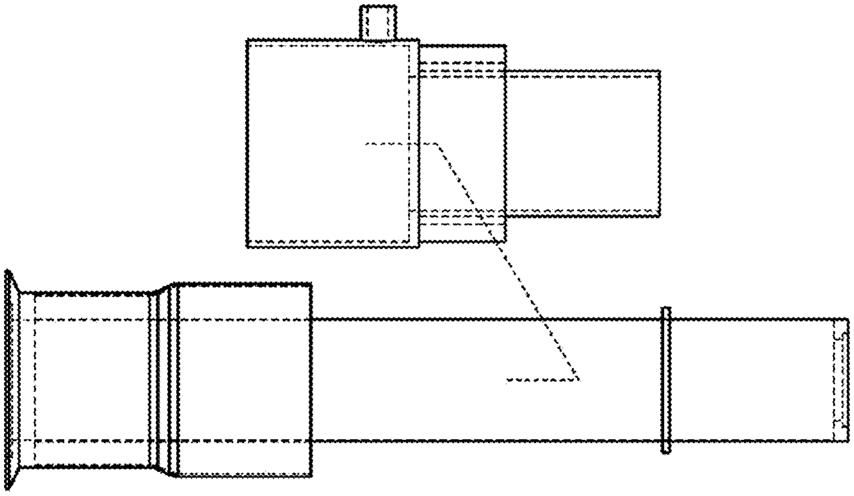
FIG. 21B is a view of a bayonet fitting.

FIGS. 21A and 21B show the three pieces of the bayonet assembly (female bayonet, adapter, and bayonet seal ring). The bayonet seal ring is welded to the adapter and the female bayonet, enclosing a vacuum area in this assembly.

Figure 22:
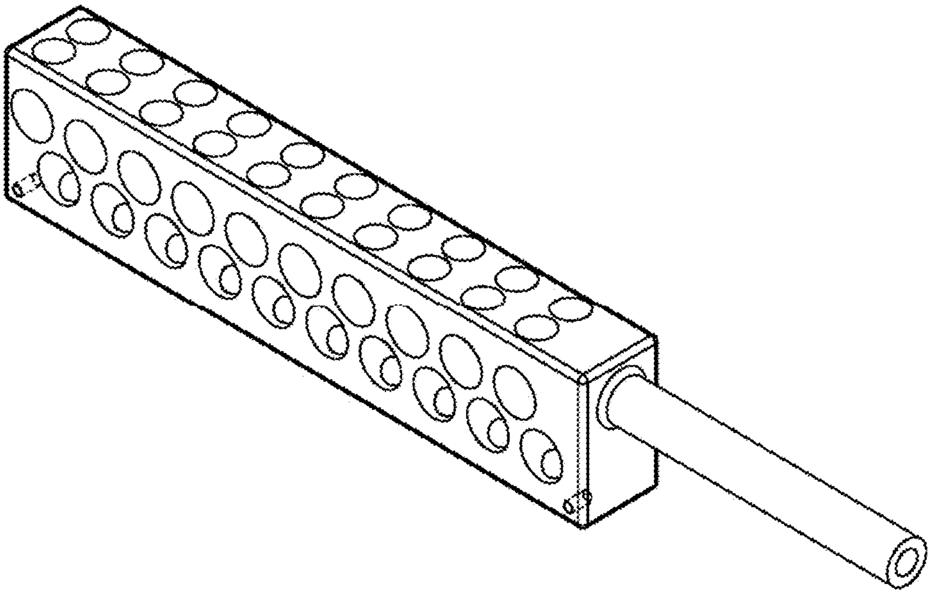
FIG. 22 is a perspective view of an electrical termination distribution block.

FIG. 22 shows an electrical terminal distribution block machined from one piece of conventional conductor, here copper. Threaded inserts are installed in the top and bottom holes for two places where setscrews secure each cable that is inserted into the front face.

Figure 23:
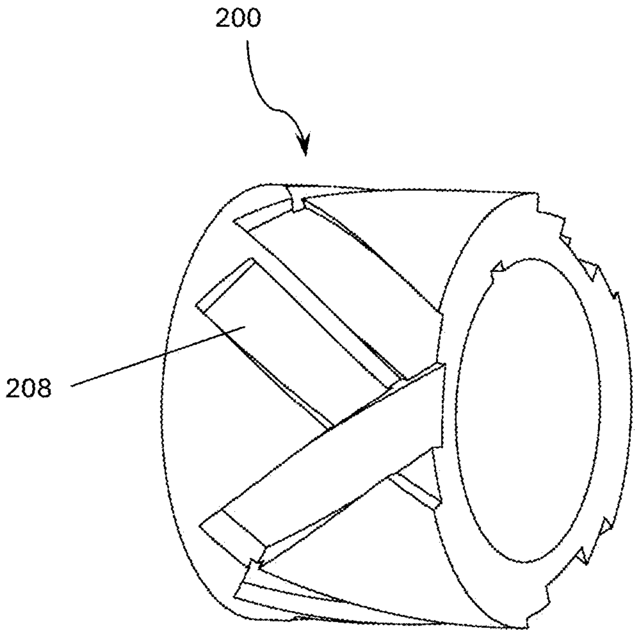
FIG. 23 is a perspective view of an electrical lug.
Figure 24:
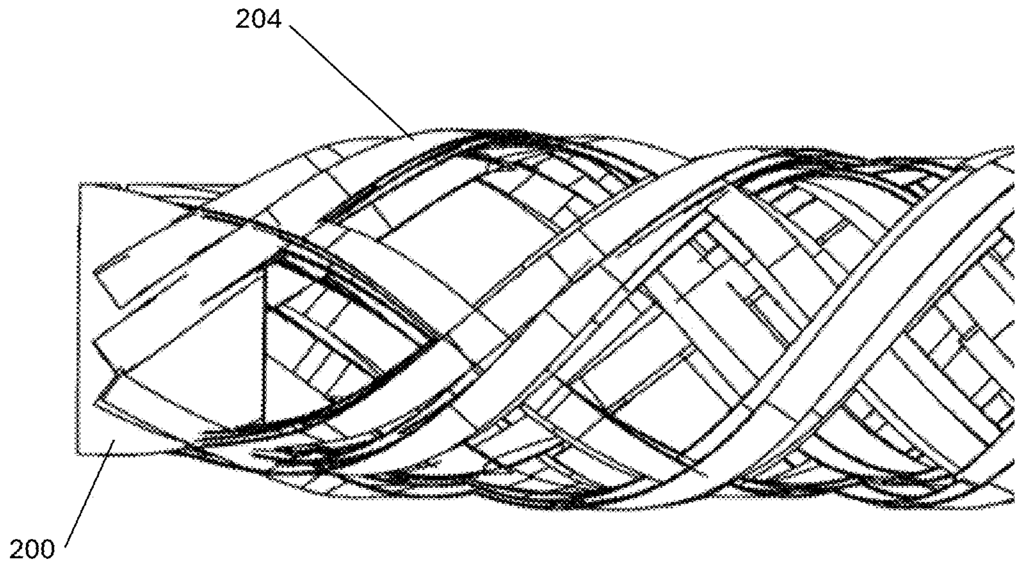
FIG. 24 is a front view of a cable with the electrical lug of FIG. 23 interconnected thereto.
Figure 25:
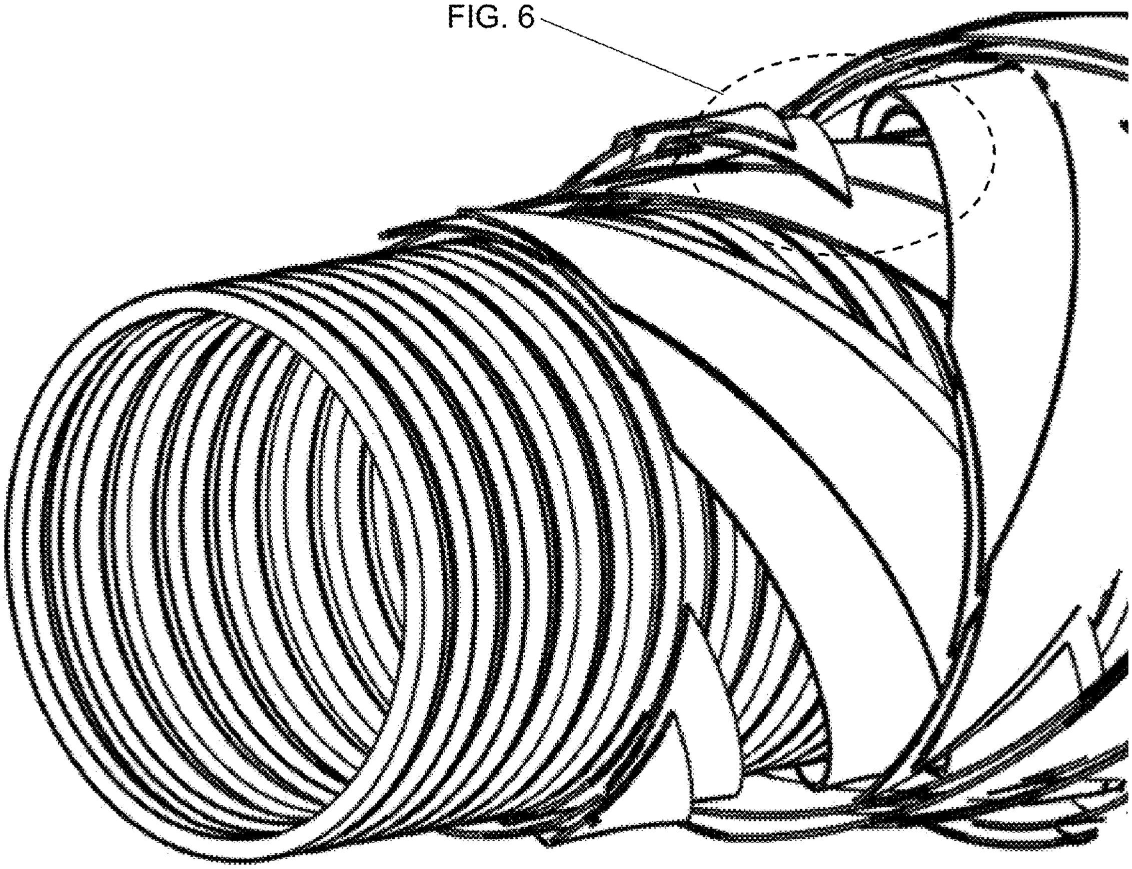
FIG. 25 is a detailed view of FIG. 6 showing a reverse wind gap bridge.

FIGS. 23 and 24 show an electrical lug 200 used by some embodiments of the present invention. In operation, SC tape 204 (or a plurality of tapes) is placed in a recess 208 integrated into the lug and soldered thereto. In some embodiments, a soldering collar (not shown) is placed around the lug to prevent excess solder flow while filling the recess. Alternatively, a compression ring may be used with or without the soldering collar. The lug supports the use of moving busbars as described herein.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that it would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. A hybrid cable, magnet, or cable magnet device, comprising:

a first layer comprising superconducting material formed as a fully transposed winding;

a second layer comprising superconducting material formed as a fully transposed winding about the first layer;

a third layer comprising superconducting material formed as a fully transposed winding about the second layer;

a fourth layer comprising a conventional conductor formed as a fully transposed winding about the third layer;

a fifth layer comprising a conventional conductor formed as a fully transposed winding about the fourth layer;

a sixth layer comprising a conventional conductor formed as a fully transposed winding about the fifth layer; and a core winding wall spaced from the sixth layer that defines an annulus between an outer surface of the sixth layer and an inner surface of the core winding wall, the annulus configured to provide a fluid flow conduit.

2. The hybrid cable, magnet, or cable magnet device of claim 1, wherein the superconducting material of at least one the first layer, the second layer, and the third layer comprises a high temperature superconductor and the conventional conductor of at least one the fourth layer, fifth layer, and sixth layer comprises copper or a copper alloy, the high temperature superconductor and conventional conductor being adapted for contact with cryogenic fluid.

3. The hybrid cable, magnet, or cable magnet device of claim 1, wherein the fourth layer is wound directly to the third layer.

4. The hybrid cable, magnet, or cable magnet device of claim 1, wherein the superconducting material of at least one of the first layer, the second layer, and the third layer is not electrically insulated, and wherein the conventional conductor of at least one of the fourth layer, the fifth layer, and the sixth layer is electrically insulated.

5. The hybrid cable, magnet, or cable magnet device of claim 4, wherein electrical insulation on the conventional conductors is non-continuous such that preselected portions of the superconducting material and conducting material touch.

6. The hybrid cable, magnet, or cable magnet device of claim 1, wherein the fully transposed windings include gaps.

7. The hybrid cable, magnet, or cable magnet device of claim 1, wherein the fully transposed windings include a reverse wind direction from layer to layer.

8. The hybrid cable, magnet, or cable magnet device of claim 1, wherein the superconducting material of at least one the first layer, the second layer, and the third layer is a high temperature superconducting tape, and the conventional conductor of the fourth layer, the fifth layer, and the sixth layer comprises copper or a copper alloy in the form of a tape.

9. The hybrid cable, magnet, or cable magnet device of claim 8, wherein the high temperature superconducting tape comprises a plurality of layers.

10. The hybrid cable, magnet, or cable magnet device of claim 8, wherein the conventional conductor is comprised of a plurality of copper tape layers.

11. The hybrid cable, magnet, or cable magnet device of claim 8, wherein superconducting tape is comprised of a plurality layers, and wherein the conventional conductor is further comprised of a plurality of copper tapes.

12. The hybrid cable, magnet, or cable magnet device of claim 1, further comprising an electromagnetic shield wound about the sixth layer.

13. The hybrid cable, magnet, or cable magnet device of claim 1, further comprising electrical insulation wound about the core winding wall and/or the inner surface of the core winding wall.

14. The hybrid cable, magnet, or cable magnet device of claim 1, wherein the first layer is wound about a former.

15. The hybrid cable, magnet, or cable magnet device of claim 14, wherein the former is at least partially hollow.

16. The hybrid cable, magnet, or cable magnet device of claim 14, wherein the former is defined by an outer wall that is at least partially porous or has at least one opening.

17. The hybrid cable, magnet, or cable magnet device of claim 14, wherein the former is comprised of a conductor.

18. The hybrid cable, magnet, or cable magnet device of claim 1, further comprising:

a seventh layer comprising superconducting material formed as a fully transposed winding about the core winding wall;

an eighth layer comprising superconducting material formed as a fully transposed winding about the seventh layer;

a ninth layer comprising superconducting material formed as a fully transposed winding about the eighth layer;

a tenth layer comprising a conventional conductor formed as a fully transposed winding about the ninth layer;

an eleventh layer comprising a conventional conductor formed as a fully transposed winding about the tenth layer;

a twelfth layer comprising a conventional conductor formed as a fully transposed winding about the eleventh layer; and a second inner wall spaced from the twelfth layer that defines a second annulus between an outer surface of the twelfth layer and an inner surface of the second inner wall, the second annulus configured to provide a fluid flow conduit.

19. The hybrid cable, magnet, or cable magnet device of claim 18, further comprising a first electromagnetic shield wound about the sixth layer and a second electromagnetic shield wound about the twelfth layer.

20. The hybrid cable, magnet, or cable magnet device of claim 19, wherein the first and second electromagnetic shields are electrically connected.

21. The hybrid cable, magnet, or cable magnet device of claim 18, wherein the first layer is wound about a former, and wherein the former and core winding wall provide protection against a mechanical force such as cryogen state change pressure expansion.

22. A hybrid cable, magnet, or cable magnet device, comprising:

a first layer comprising conventional conductor;

a second layer comprising conventional conductor formed as a winding adjacent to the first layer;

a third layer comprising conventional conductor formed as a winding adjacent to the second layer;

a fourth layer comprising a superconducting material formed as a winding adjacent to the third layer;

a fifth layer comprising a superconducting material formed as a winding adjacent to the fourth layer;

a sixth layer comprising a superconducting material formed as a winding adjacent to the fifth layer; and an inner wall spaced from the sixth layer that defines an annulus between an outer surface of the sixth layer and an inner surface of the inner wall, the annulus configured to provide a fluid flow conduit.

23. A hybrid cable, magnet, or cable magnet device, comprising:

a first layer comprising superconducting material formed as a fully transposed winding;

an electrical induction altering or canceling second layer associated with the first layer;

wherein the second layer comprises a conducting material formed as a fully transposed winding; and wherein the first layer is further comprised of one or more superconducting sub-layers formed of fully transposed windings and/or wherein second layer is further comprised of one or more sub-layers formed of fully transposed windings.

24. A hybrid superconducting device, comprising:

a first layer comprising superconducting material formed as a winding;

an electrical induction altering or canceling second layer associated with the first layer;

wherein the second layer comprises a conducting material formed as a winding; and wherein at least one of the following is true:

a) the superconducting material and/or the conducting material are in the form of tapes wound in opposite directions per layer, which creates a mesh pattern with a plurality of gaps, b) the superconducting material and/or the conducting material are in the form of a mesh having a plurality of gaps that allow cooling fluid flow between layers, c) the superconducting material and/or the conducting material are in the form of a mesh having a plurality of gaps that gaps allow inductive electromagnetic canceling, d) the superconducting material and/or the conducting material are in the form of a mesh having a plurality of gaps that gaps of successive layers overlap to form channels, e) the superconducting material is solid, multifilamentary, consists of multiple wires, tape, or fully transposed tapes grouped into subcables, and wherein the conducting material is solid, multifilamentary, consists of multiple wires, tape, or fully transposed tapes grouped into subcables, f) the superconducting material comprises a high temperature superconductor, g) at least one of the superconducting material and conducting material is electrically insulated, wherein the superconducting material and/or conducting material are electrically insulated in a non-continuous fashion such that preselected portions of the superconducting material and conducting material touch, h) the superconducting material and conducting material are electrically insulated, wherein the superconducting material and/or conducting material are electrically insulated in a non-continuous fashion such that preselected portions of the superconducting material and conducting material touch, and i) the superconducting material and the conducting material are not electrically insulated.

25. A method of transmitting electric current, comprising:

providing a hybrid cable, magnet, or cable magnet device comprising a first layer of superconducting material, and a second layer positioned adjacent to the first layer;

chilling at least a portion of the hybrid cable to a predetermined temperature;

wherein in a first mode of operation, electric current flows primarily through the first layer;

wherein in a second mode of operation, characterized by partial or full quench of the first layer, electric current flows through the first layer and the second layer; and wherein in a third mode of operation, electric current is transmitted primarily through the second layer.

26. The method of claim 25, wherein the hybrid cable, magnet, or cable magnet device carries a first current when operating in the first mode of operation, a second current when operating in the second mode of operation, and a third current when operating in the third mode of operation, wherein:

the third current is less than the second current, and the second current is less than the first current.

27. The method of claim 25, wherein the second layer is comprised of a conventional conductor;

wherein the first layer is comprised of a fully transposed winding;

wherein the second layer is comprised of a fully transposed winding; and wherein the superconducting material and the conventional conductor are windings that possess a plurality of gaps and/or channels that allow cooling fluid flow between layers.

28. The method of claim 27, wherein a period of the fully transposed winding of the second layer is equal to or less than a period of the fully transposed winding of the first layer.

29. The hybrid cable, magnet, or cable magnet device of claim 1, wherein at least one termination of the hybrid cable, magnet, or cable magnet device incorporates a movable bus configured to move with an associated hard connection, wherein at least one superconducting flexible strap is provided that connects the movable bus to static buses of the termination.

* * * * *